(12) United States Patent
Saito

(10) Patent No.: US 7,158,319 B2
(45) Date of Patent: Jan. 2, 2007

(54) IMAGING LENS SYSTEM

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/374,596

(22) Filed: Mar. 13, 2006

(65) Prior Publication Data
US 2006/0268432 A1    Nov. 30, 2006

(30) Foreign Application Priority Data
May 25, 2005    (JP) .............. 2005-152214

(51) Int. Cl.
G02B 9/04    (2006.01)
(52) U.S. Cl. .............. 359/795; 359/793; 359/691
(58) Field of Classification Search .......... 359/793, 359/791, 691, 795, 692, 779, 785, 780, 690, 359/689
See application file for complete search history.

(56) References Cited
U.S. PATENT DOCUMENTS
5,835,281 A    11/1998    Ohno

2005/0057679 A1    3/2005    Isono
2006/0056072 A1    3/2006    Zeng et al.

FOREIGN PATENT DOCUMENTS

| JP | 03-127014 | 5/1991 |
|---|---|---|
| JP | 11-030701 | 2/1999 |
| JP | 2003-075719 | 3/2003 |
| JP | 2003-227999 | 8/2003 |
| JP | 2003-329921 | 11/2003 |
| JP | 2004-004742 | 1/2004 |

Primary Examiner—Timothy Thompson
Assistant Examiner—Jerry Fang
(74) Attorney, Agent, or Firm—Koda & Androlia

(57) ABSTRACT

It is to provide an imaging lens system which, while reduced in size and weight, can fully meet the demand for more improvement in the optical performance and also improvement in the productivity. The imaging lens system comprises, in order from an object side towards an image surface side, a diaphragm, a first lens which is a meniscus lens having a positive power whose concave surface facing the object side, and a second lens which is a meniscus lens having a negative power whose convex surface facing the image surface side, wherein the Abbe number of the second lens is set smaller than the Abbe number of the first lens.

7 Claims, 15 Drawing Sheets

IMAGING LENS SYSTEM

BACKGROUND OF THE INVENTION

1. Field of the Invention

The present invention relates to an imaging lens system and, particularly, to an imaging system of two-lens structure, which is capable of reducing the size and weight and improving the optical performance and productivity. The imaging system is used for an image-taking device that forms images of objects such as scenery and human figures on an image taking surface of a solid image sensor element such as a CCD, CMOS, etc., which is mounted on a portable computer, a television telephone, a cellular phone, and the like.

2. Description of the Related Art

Recently, there has been an increasing demand for reducing the size and weight and improving the optical performance (high resolution of the solid image sensor element, etc) of an image-taking device (camera) that utilizes a solid image sensor element such as a CCD, CMOS, or the like, which is mounted on a portable telephone, a portable computer, and a television telephone, for example.

Therefore, it is also necessary for the imaging lens system used for such image-taking device to be small and light. In addition, the imaging lens system is required to have an excellent optical performance in order for the solid image sensor element to exhibit the sufficient resolution capacity.

In order to meet such demands, recently, there has been a spread of a lens system with two-lens structure that is small, light, and capable of exhibiting a more excellent optical performance than that of a single-lens structure lens system. It is expected that the importance of such lens system with two-lens structure will increase more and more in the future.

As the lens system with two-lens structure, there have been known the lens systems disclosed in Patent Literatures 1–4.

[Patent Literature 1] Japanese Patent Unexamined Publication 2004-4742

[Patent Literature 2] Japanese Patent Unexamined Publication 2003-329921

[Patent Literature 3] Japanese Patent Unexamined Publication 2003-227999

[Patent Literature 4] Japanese Patent Unexamined Publication 2003-75719

Each fundamental structure of the lens systems disclosed in Patent Literatures 1–4 belongs to one of the three types 1–3 described hereinafter.

(Type 1)

A lens system in which an object side lens (referred to as a first lens hereinafter) is a biconvex lens with a positive power, an image surface side lens (referred to as a second lens hereinafter) is a meniscus lens with a negative power, and a diaphragm is disposed on the object side of the first lens.

(Type 2)

A lens system in which the first lens is a biconvex lens with a positive power, the second lens is a meniscus lens with a positive power, and a diaphragm is disposed on the object side of the first lens.

(Type 3)

A lens system in which the first lens is a meniscus lens with a positive power with its concave surface facing the object side, the second lens is a meniscus lens with a positive power, and a diaphragm is disposed on the object side of the first lens.

However, the lens systems belonging to those types 1–3 have the following problems.

In the lens systems belonging to Types 1–2, the object-side face of the first lens has a protruded shape towards the object side. Thus, it is not possible to achieve both the high telecentricity and back focus distance at the same time.

In the lens system belonging to Type 3, the second lens has positive power so that the chromatic aberration cannot be well-corrected even if dispersions of the first lens and the second lens are made different from each other. Particularly, an auto-focus mechanism has recently been mounted on a small-size camera that is used for a portable telephone and the like with a built-in camera. Accordingly, in the lens system used for the camera with such auto-focus mechanism, it is extremely important to well-correct various aberrations on the optical axis (particularly, the axial chromatic aberration) in order to precisely detect the best focus position near the center of the screen. In the lens system belonging to Type 3, it is difficult to well-correct such axial chromatic aberration, and the performance of the auto-focus mechanism cannot be fully utilized.

Therefore, it is the fact that there has not been proposed an effective lens system which can further improve the optical performance while being reduced in size and weight.

The present invention has been designed in view of the aforementioned problems. The object of the present invention therefore is to provide an imaging lens system which, while reduced in size and weight, can fully meet the demand for further improvement in the optical performance and also improvement in the productivity.

SUMMARY OF THE INVENTION

In order to achieve the aforementioned object, the imaging lens system according to a first aspect of the present invention is an imaging lens system used for forming an image of an object on an image taking surface of a solid image sensor element, which comprises: in order from an object side towards an image surface side, a diaphragm, a first lens which is a meniscus lens having a positive power whose concave surface facing the object side, and a second lens which is a meniscus lens having a negative power whose convex surface facing the image surface side, wherein conditions expressed by each of following expressions (1)–(8) are to be satisfied;

$$1.65 \geq L/fl \geq 0.9 \tag{1}$$

$$-0.4 \geq f_1/f_2 \geq -0.7 \tag{2}$$

$$0.63 \geq f_1/fl \geq 0.4 \tag{3}$$

$$-0.85 \geq f_2/fl \geq -1.15 \tag{4}$$

$$0.65 \geq d_2/d_1 \div 0.35 \tag{5}$$

$$4 \geq fl \geq 1 \tag{6}$$

$$-1.5 \geq (r_3+r_4)/(r_3-r_4) > -2 \tag{7}$$

$$0.45 \geq d_1/fl \geq 0.25 \tag{8}$$

where,

L: entire length of the lens system (distance between the diaphragm and the image taking surface on an optical axis (air reduced length)

fl: focal distance of the entire lens system
$f_1$: focal distance of the first lens
$f_2$: focal distance of the second lens
$d_1$: center thickness of the first lens
$d_2$: distance between the first lens and second lens on the optical axis
$r_3$: curvature radius of the object side face of the second lens
$r_4$: curvature radius of the image surface side face of the second lens In the first aspect of the present invention, the diaphragm is disposed at a position closest to the object side and the first lens is a meniscus lens having a positive power with its concave surface facing the object side. With this, it is possible to secure a high telecentricity, back focus distance, and an excellent optical performance, to reduce the size and weight of the entire optical system, and to improve the productivity.

The productivity herein means not only the productivity for mass-producing imaging lens systems (for example, moldability, cost, and the like when imaging lens systems are mass-produced by injection molding), but also easiness of processing, manufacture, etc. of equipment (for example, easiness of processing and the like of a mold used for injection molding), which is used for manufacturing the imaging lens systems (the same is true hereinafter).

Further, in the first aspect of the present invention, the second lens is a meniscus lens having a negative power with its convex surface facing the image surface side. This allows an excellent correction of the chromatic aberration, an improvement in the optical performance of the periphery, and an effective utilization of light rays that make incidence on the periphery of the solid image sensor element.

Moreover, in the first aspect of the present invention, each of the expressions (1)–(8) is satisfied. Thereby, it becomes possible to improve the telecentricity and the optical performance further while achieving more reduction of the size and weight and improvement in the productivity. Moreover, by satisfying each of the expression (1)–(8), it is possible to achieve more excellent correction of the chromatic aberration, more improvement in the optical performance of the periphery, and more effective utilization of light rays that make incidence on the periphery of the solid image sensor element.

An imaging lens system according to a second aspect is the imaging lens system according to the first aspect, wherein, further, a condition expressed by a following expression (9) is to be satisfied;

$$0.3 \geq d_3/fl \geq 0.15 \quad (9)$$

where, $d_3$: the center thickness of the second lens

In the second aspect of the invention, further, the expression (9) is satisfied. Thereby, the entire optical system can be more reduced in size and weight so that the productivity can be more improved.

An imaging lens system according to a third aspect of the present invention is the imaging lens system according to the first or second aspect, wherein the Abbe number of the second lens is set smaller than the Abbe number of the first lens, and the Abbe number of the second lens satisfies a condition expressed by a following expression;

$$v_2 < 35 \quad (10)$$

where, $v_2$: Abbe number of the second lens

In the third aspect of the invention, further, the second lens is formed with a material having higher dispersion than that of the first lens, and the expression (10) is satisfied. Thereby, the chromatic aberration can be more excellently corrected.

Furthermore, an imaging lens system according to a fourth aspect is the imaging lens system according to any one of aspects 1–3, wherein, further, a condition expressed by a following expression (11) is to be satisfied;

$$1 \geq D/fl \geq 0.8 \quad (11)$$

where, D: distance between the diaphragm and the image surface side face of the second lens on the optical axis In the fourth aspect of the invention, further, the expression (11) is satisfied. With this, it is possible to correct various aberrations (particularly, distortion) more excellently and improve the productivity further while achieving more reduction of the size and weight in the entire optical system.

Further, an imaging lens system according to a fifth aspect satisfies a condition expressed by a following expression (12);

$$0.2 \geq S/f_1 \geq 0.05 \quad (12)$$

where, S: distance between the diaphragm and the object side face of the first lens on the optical axis In the fifth aspect of the invention, the expression (12) is satisfied. With this, it is possible to improve the optical performance further while maintaining the productivity. Also, it allows effective utilization of light rays that make incidence on the periphery of the solid image sensor element. Furthermore, it is possible to secure still higher telecentricity while reducing the size and weight of the entire optical system.

Moreover, an imaging lens system of the sixth aspect is the imaging lens system according to any one of aspects 1–5, wherein, further, a condition expressed by a following expression (13) is to be satisfied;

$$1.7 > (r_1 + r_2)/(r_1 - r_2) > 0.8 \quad (13)$$

where, $r_1$: curvature radius of the object side face of the first lens $r_2$: curvature radius of the image surface side face of the first lens In the sixth aspect of the invention, further, the expression (13) is satisfied. With this, various aberrations (particularly, the chromatic aberration and coma aberration) can be more excellently corrected.

Furthermore, an imaging lens system according to a seventh aspect is the imaging lens system according to any one of aspects 1–6, wherein, further, conditions expressed by following expressions (14) and (15) are to be satisfied;

$$0.8 \geq Bfl/fl \geq 0.4 \quad (14)$$

$$1.5 \geq Bfl \geq 0.9 \quad (15)$$

where, Bfl: back focus distance (distance between the image surface side face of the second lens and the image surface on the optical axis (air reduced length))

In the seventh aspect of the invention, further, each of the expressions (14) and (15) is satisfied. With this, a more effective reduction in the size and weight can be achieved. In addition, it allows a more improved productivity and easy assembly.

With the imaging lens system according to the first aspect of the present invention, it is possible to achieve an imaging lens system that is small and light, excellent in optical performance, and has excellent productivity.

Further, in addition to the effects of the imaging lens system according to the first aspect, the imaging lens system according to the second aspect can achieve an imaging lens system that is more reduced in size and weight and has more excellent productivity.

Furthermore, in addition to the effects of the imaging lens system according to the first or second aspect, the imaging lens system according to the third aspect can achieve a small-size imaging lens system with more excellent optical performance in which the chromatic aberration is more excellently corrected.

Moreover, in addition to the effects of the first–third aspects, the imaging lens system according to the fourth aspect can achieve an imaging lens system that is more reduced in size and weight and more excellent in the optical performance and the productivity.

Further, in addition to the effects of the imaging lens system according to any one of the aspects 1–4, the imaging lens system according to the fifth aspect can achieve a small-size imaging lens system that is more excellent in the optical performance and productivity, which can more effectively utilize the light rays that make incidence on the periphery of the solid image sensor element.

Furthermore, in addition to the effects of the imaging lens system according to any one of the aspects 1–5, the imaging lens system according to the sixth aspect can achieve an imaging lens system with more excellent optical performance.

Moreover, in addition to the effects of the imaging lens system according to any one of the aspects 1–6, the imaging lens system according to the seventh aspect can achieve an imaging lens system that is suitable for more reduction of size and weight and an improvement in the productivity.

DETAILED DESCRIPTION OF THE PREFERRED EMBODIMENT

An embodiment of an imaging lens system according to the present invention will be described hereinafter by referring to FIG. 1.

Figure 1:
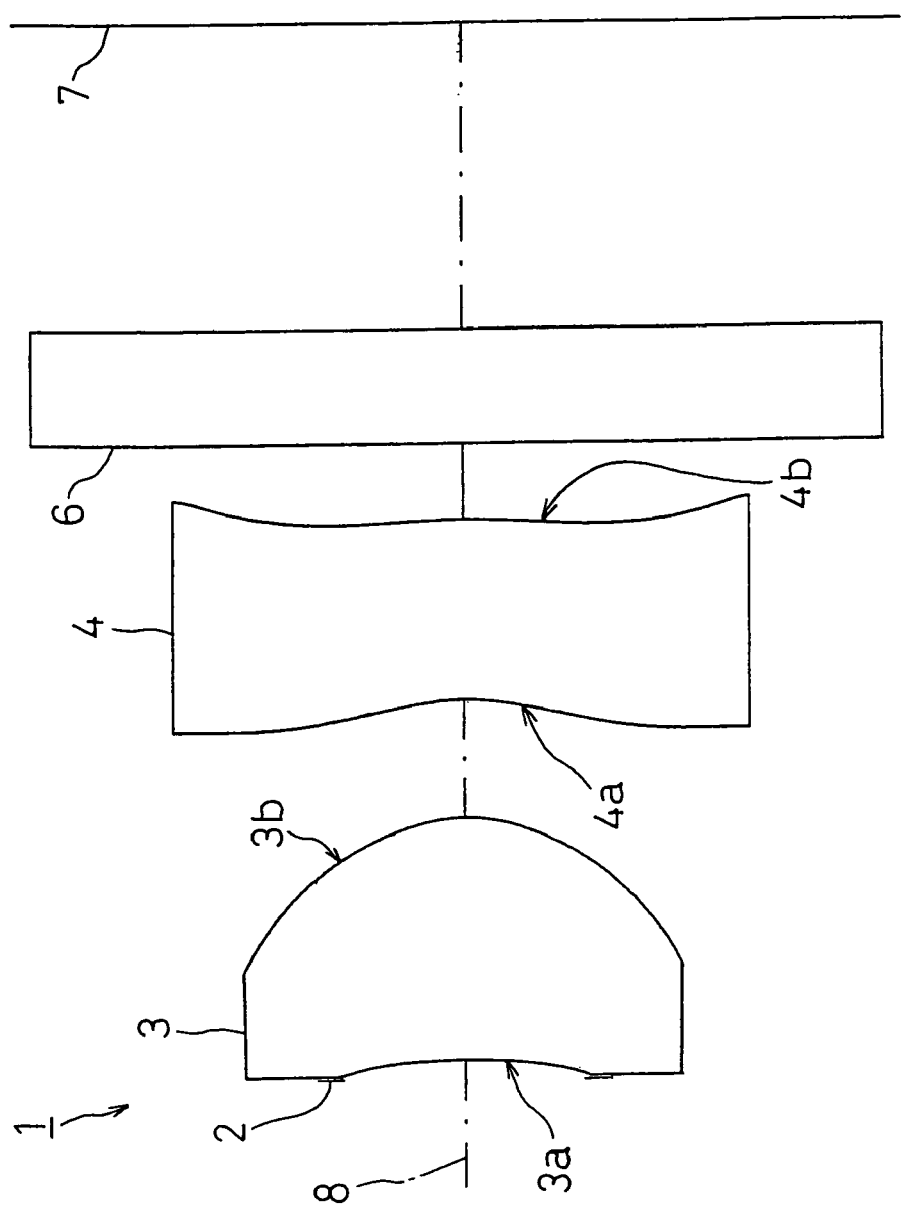
FIG. 1 is a schematic diagram for showing an embodiment of the imaging lens system according to the present invention.

As shown in FIG. 1, an imaging lens system 1 of the embodiment comprises, in order from the object side towards the image surface side, a diaphragm 2, a resin-type first lens 3 which is a meniscus lens having a positive power with its concave surface facing the object side, and a resin-type second lens 4 which is a lens having a negative power with its convex surface facing the image surface side.

In the followings, each of the lens surfaces of the first lens 3 and the second lens 4 on the object side is referred to as a first face thereof, and each lens surface on the image surface side is referred to as a second face thereof, respectively.

On the second face 4b side of the second lens 4, there are disposed various filters 6 such as a cover glass, an IR cut filter, and a lowpass filter, and an image taking surface 7 which is a light-receiving surface of an image sensor element such as a CCD or a CMOS, respectively. The various filters 6 may be omitted as appropriate.

In the embodiment, as described above, the diaphragm 2 is disposed at a position closest to the object side and the first lens 3 is the meniscus lens having a positive power with its concave surface facing the object side. This allows the position of an exit pupil to be distant.

Thereby, high telecentricity can be secured and the incident angle of light rays with respect to the sensor of the solid image sensor element can be modified (made close to vertical).

Further, such surface shape of the first lens 3 and the positioning of the diaphragm 2 enables an improvement in the productivity while maintaining the excellent optical performance and achieving reduction of the size and weight in the entire optical system.

Furthermore, in the embodiment, the second lens 4 is a meniscus lens having a negative power with its convex surface facing the image surface side. This enables excellent correction of the chromatic aberration and distortion.

Moreover, such surface shape of the second lens 4 allows an improvement in the optical property of the periphery. In addition, it allows effective utilization of light rays that make incidence on the periphery of the solid image sensor element.

Therefore, it is possible with the embodiment to secure the telecentricity and to correct the chromatic aberration in a well-balanced manner while achieving reduction of the size and weight in the entire lens system. Moreover, it allows an improvement in the productivity, an excellent optical performance, and effective utilization of the light rays.

Further, in the embodiment, the imaging lens system 1 is to satisfy each condition expressed by the following expressions (1)–(8).

$$1.65 \geq L/fl \geq 0.9 \quad (1)$$

$$-0.4 \geq f_1/f_2 \geq -0.7 \quad (2)$$

$$0.63 \geq f_1/fl \geq 0.4 \quad (3)$$

$$-0.85 \geq f_2/fl \geq -1.15 \quad (4)$$

$$0.65 \geq d_2/d_1 \geq 0.35 \quad (5)$$

$$4 \geq fl \geq 1 \quad (6)$$

$$-1.5 > (r_3+r_4)/(r_3-r_4) > -2 \quad (7)$$

$$0.45 \geq d_1/fl \geq 0.25 \quad (8)$$

where, L in the expression (1) is the entire length of the lens system, i.e. the distance between the diaphragm 2 and the image taking surface 7 on an optical axis 8 (air reduced length). fl in the expressions (1), (3), (4), (6), and (8) is the focal distance of the entire lens system. $f_1$ in the expressions (2) and (3) is the focal distance of the first lens 3. Further, $f_2$ in the expressions (2) and (4) is the focal distance of the second lens 4. $d_1$ in the expressions (5) and (8) is the center thickness of the first lens 3. Further, $d_2$ in the expression (5) is the distance between the first lens 3 and the second lens 4 on the optical axis 8. Furthermore, $r_3$ in the expression (7) is the curvature radius of the first face 4a of the second lens 4, and $r_4$ in the expression (7) is the curvature radius of the second face 4b of the second lens 4.

When the value of the L/fl exceeds the value (1.65) shown in the expression (1), the entire optical system becomes large-scaled against the demand for reducing the size and weight. In the meantime, when the value of L/fl becomes below the value (0.9) shown in the expression (1), the entire optical system is downsized. Thus, the productivity is deteriorated and it becomes difficult to maintain the optical performance. In addition, it becomes difficult to maintain the necessary back focus distance.

Accordingly, with the embodiment, it becomes possible to reduce the size and weight of the entire optical system sufficiently while maintaining the necessary back focus distance through setting the value of L/fl to satisfy the expression (1). Furthermore, an excellent optical performance can be maintained and the productivity can be improved as well.

It is more preferable for the relation between L and fl to satisfy an expression $1.6 \geq L/fl \geq 1.2$.

Further, when the value of $f_1/f_2$ exceeds the value (−0.4) shown in the expression (2), the power of the first lens 3 becomes too strong so that the productivity of the first lens 3 is deteriorated. In addition, the power of the first lens 3 and that of the second lens 4 become unbalanced, thereby deteriorating the optical performance.

In the meantime, when the value of $f_1/f_2$ becomes below the value (−0.7) shown in the expression (2), the power of the second lens 4 becomes too strong so that the productivity of the second lens 4 is deteriorated. In addition, the power of the first lens 3 and that of the second lens 4 become unbalanced, thereby deteriorating the optical performance.

Therefore, with the embodiment, it allows a further improvement in the productivity by setting the value of $f_1/f_2$ to satisfy the expression (2). In addition, the power of the first lens 3 and that of the second lens 4 can be well-balanced. Thus, more excellent optical performance can be maintained.

It is more preferable for the relation between $f_1$ and $f_2$ to satisfy an expression $-0.45 \geq f_1/f_2 \geq -0.55$.

Furthermore, when the value of $f_1/fl$ exceeds the value (0.63) shown in the expression (3), the back focus distance becomes too long so that reduction of the size and weight becomes difficult. In addition, it becomes difficult to maintain a desired view angle and the optical performance at the same time.

In the meantime, when the value of $f_1/fl$ becomes below the value (0.4) shown in the expression (3), it is difficult to maintain the necessary back focus distance. In addition, it becomes difficult to maintain a desired view angle and the optical performance at the same time.

Therefore, by setting the value of $f_1/fl$ to satisfy the expression (3), it becomes possible with the embodiment to reduce the size and weight further and to improve the productivity while maintaining the necessary back focus distance. In addition, an excellent optical performance can be secured while maintaining the desired view angle.

It is more preferable for the relation between $f_1$ and fl to satisfy an expression $0.6 \geq f_1/fl \geq 0.5$.

Moreover, when the value of $f_2/fl$ exceeds the value (−0.85) shown in the expression (4), the power of the second lens 4 becomes too strong so that the productivity of the second lens 4 is deteriorated. Relatively, the power of the first lens 3 becomes too strong. Thus, the productivity of the first lens 3 is deteriorated as well.

In the meantime, when the value of $f_2/fl$ becomes below the value (−1.15) shown in the expression (4), the power of the second lens 4 becomes insufficient. Thus, the chromatic aberration and the like cannot be effectively corrected and it becomes difficult to improve the optical performance.

Therefore, by setting the value of $f_2/fl$ to satisfy the expression (4), it becomes possible with the embodiment to improve the productivity and the optical performance further.

It is more preferable for the relation between $f_2$ and fl to satisfy an expression $-0.95 \geq f_2/fl \geq -1.1$.

Further, when the value of $d_2/d_1$ exceeds the value (0.65) shown in the expression (5), the value of $d_2$ becomes relatively large so that it becomes difficult to maintain the necessary back focus distance. In addition, the height of light ray passing through the second face 4b of the second lens becomes too high, which further deteriorates the productivity.

In the meantime, when the value of $d_2/d_1$ becomes below the value (0.35) shown in the expression (5), the value of $d_1$ becomes relatively large so that the back focus distance becomes too long. Thereby, reduction of the size and weight in the entire lens system becomes difficult. In addition, it becomes difficult to insert the diagram for effectively restricting the light amount.

Therefore, it becomes possible with the embodiment to improve the productivity further by setting the value of $d_2/d_1$ to satisfy the expression (5). In addition, it becomes possible to reduce the size and weight in the entire optical system more effectively while maintaining the necessary back focus distance. Moreover, the optical performance can be more excellently maintained.

It is more preferable for the relation between $d_2$ and $d_1$ to satisfy an expression $0.55 \geq d_2/d_1 \geq 0.45$.

Furthermore, when the value of fl is out of the values (4≧fl≧1) as in the expression (6), the lens becomes inappropriate for a camera module to be mounted on a portable terminal and the like.

Therefore, by further setting the value of fl to satisfy the expression (6) in the embodiment, the lens can be provided with a more preferable structure for the camera module to be mounted on the portable terminal and the like.

It is more preferable for the value of fl to satisfy an expression 3≧fl≧1.

Furthermore, when the value of $(r_3+r_4)/(r_3-r_4)$ exceeds the value (−1.5) shown in the expression (7), various variations (particularly, chromatic aberration) cannot be corrected effectively so that the optical performance is deteriorated.

In the meantime, when the value of $(r_3+r_4)/(r_3-r_4)$ becomes below the value (−2) shown in the expression (7), various variations (particularly, coma aberration) cannot be corrected effectively so that the optical performance is deteriorated.

Therefore, by further setting the value of $(r_3+r_4)/(r_3-r_4)$ to satisfy the expression (7) in the embodiment, various aberrations can be more excellently corrected and an excellent optical performance can be achieved.

It is more preferable for the value of $(r_3+r_4)/(r_3-r_4)$ to satisfy an expression $-1.8>(r_3+r_4)/(r_3-r_4)>-2$.

Furthermore, when the value of $d_1/fl$ exceeds the value (0.45) shown in the expression (8), the entire length of the optical system becomes too long. Thus, reduction of the size and weight becomes difficult. In the meantime, when the value of $d_1/fl$ becomes below the value (0.25) shown in the expression (8), manufacture of the first lens 3 becomes difficult.

Therefore, it is possible with the embodiment to reduce the size and weight further and to improve the productivity by setting the value of $d_1/fl$ to satisfy the expression (8).

It is more preferable for the relation between $d_1$ and fl to satisfy an expression $0.45 \geq d_1/fl \geq 0.3$.

In addition to the above-described structures, it is desirable to satisfy a condition expressed by a following expression (9).

$$0.3 \geq d_3/fl \geq 0.15 \tag{9}$$

where, $d_3$ in the expression (9) is the center thickness of the second lens 4.

With this, the size and weight of the entire system can be more reduced so that the productivity (mass-productivity) can be more improved.

It is more preferable for the relation between $d_3$ and fl to satisfy an expression $0.3 \geq d_3/fl \geq 0.2$.

Furthermore, in addition to the above-described structures, the Abbe number of the second lens 4 is desirable to be smaller than that of the first lens 3 and to satisfy the following expression (10).

$$v_2 \geq 35 \tag{10}$$

where, $v_2$ is the Abbe number of the second lens 4.

In addition to the above-described structures, it is more desirable to satisfy the following expression (11).

$$1 \geq D/fl \geq 0.8 \tag{11}$$

where, D in the expression (11) is the distance between the diaphragm 2 and the second face 4b of the second lens 4 on the optical axis 8.

With this, it is possible to correct various aberrations (particularly, distortion) and achieve an excellent optical performance while further reducing the size and weight of the entire optical system. Moreover, the productivity can be more improved.

It is more preferable for the relation between D and fl to satisfy an expression $0.95 \geq D/fl \geq 0.8$.

In addition to the above-described structures, it is more desirable to satisfy the following expression (12).

$$0.2 \geq S/f_1 \geq 0.05 \tag{12}$$

where, S in the expression (12) is the distance between the diaphragm 2 and the first face 3a of the first lens 3 on the optical axis 8.

As described, by appropriately defining the position of the diaphragm 2 and the power of the first lens 3 (the lens with the main power), the optical performance of the periphery can be improved without imposing a burden on shapes and the like of the lenses 3 and 4 (particularly, the first lens 3). Furthermore, the light rays making incidence on the periphery of the solid image sensor element can be more effectively utilized. Moreover, it becomes possible to secure still higher telecentricity while reducing the size and weight of the entire optical system.

Especially, in the small-size optical system (lens system) as that of the present invention, a drastic change in the distance (value of S) between the diaphragm 2 and the first face 3a of the first lens 3 on the optical axis 8 exerts a tremendous influence on the optical performance. Therefore, it is important to set the value of S within the range as in the expression (12) so that there is no bad influence exerted on the optical performance.

It is more preferable for the relation between S and $f_1$ to satisfy an expression $0.15 \geq S/f_1 \geq 0.05$.

In addition to the above-described structures, it is more desirable to satisfy the following expression (13).

$$1.7>(r_1+r_2)/(r_1-r_2)>0.8 \tag{13}$$

where, $r_1$ in the expression (13) is the curvature radius of the first face 3a of the first lens 3, and $r_2$ is the curvature radius of the second face 3b of the first lens 3.

When the value of $(r_1+r_2)/(r_1-r_2)$ exceeds the value (1.7) shown in the expression (13), various variations (particularly, chromatic aberration) cannot be corrected effectively so that the optical performance is deteriorated.

In the meantime, when the value of $(r_1+r_2)/(r_1-r_2)$ becomes below the value (0.8) shown in the expression (13), various variations (particularly, coma aberration) cannot be corrected effectively so that the optical performance is deteriorated.

Therefore, further, by setting the value of $(r_1+r_2)/(r_1-r_2)$ to satisfy the expression (13), various aberrations (particularly, the chromatic aberration and coma aberration) can be more excellently corrected and an excellent optical performance can be achieved.

It is more preferable for the value of $(r_1+r_2)/(r_1-r_2)$ to satisfy an expression $1.7>(r_1+r_2)/(r_1-r_2)>1.4$.

In addition to the above-described structures, it is more desirable to satisfy the following expressions (14) and (15).

$$0.8 \geq Bfl/fl \geq 0.4 \tag{14}$$

$$1.5 \geq Bfl \geq 0.9 \tag{15}$$

where, Bfl in the expressions (14) and (15) is the back focus distance (distance between the second face 4b of the second lens 4 and the image taking surface 7 on the optical axis 8 (air reduced length)).

When the value of Bfl/fl exceeds the value (0.8) shown in the expression (14), reduction of the size and weight becomes difficult. In the meantime, when the value of Bfl/fl becomes below the value (0.4) shown in the expression (14), insertion of necessary filters and the like becomes difficult. Thus, the productivity as a camera module is deteriorated.

Therefore, by setting the value of Bfl/fl to satisfy the expression (14), it becomes possible to reduce the size and weight more effectively. In addition, it allows a more improved productivity and easy assembly.

It is more preferable for the value of Bfl/fl to satisfy an expression $0.7 \geq Bfl/fl \geq 0.55$.

Furthermore, when the value of Bfl exceeds the value (1.5) shown in the expression (15), reduction of the size and weight becomes difficult. In the meantime, when the value of Bf/fl becomes below the value (0.9) shown in the expression (15), insertion of necessary filters and the like becomes difficult. Thus, the productivity as a camera module is deteriorated.

Therefore, by setting the value of Bfl to satisfy the expression (15), it becomes possible to reduce the size and weight more effectively. In addition, it allows a more improved productivity and easy assembly.

It is more preferable for the value of Bfl to satisfy an expression $1.5 \geq Bfl \geq 1.3$.

Moreover, examples of a resin material used for molding the first lens 3 and the second lens 4 may be materials of various compositions with transparency such as acryl, polycarbonate, amorphous polyolefin resin, etc.

EXAMPLES

Next, EXAMPLES of the present invention will be described by referring to FIG. 2–FIG. 15.

In the EXAMPLES, F no denotes F number and r denotes the curvature radius of the optical surface (the center radius curvature in the case of a lens). Further, d corresponding to each optical surface denotes the distance from the respective optical surface to the next optical surface. Furthermore, nd denotes the index of refraction of the optical system when the d line (yellow) is irradiated, and vd denotes the Abbe number of each optical system also when the d line is irradiated.

k, A, B, C and D denote each coefficient in a following expression (16). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, D are the aspherical coefficients, and r is the curvature radius.

$$Z(X) = r^{-1}X^2/[1+\{1-(k+1)r^{-2}X^2\}^{1/2}] + AX^4 + BX^6 + CX^8 + DX^{10} \quad (12)$$

In the following EXAMPLES, reference code E used for a numerical value denoting the aspherical coefficient indicates that the numerical value following E is an exponent having 10 as the base and that the numerical value before E is multiplied by the numerical value denoted by the exponent having 10 as the base.

For example, "0.114+1" denotes "$0.114 \times 10^1$".

First Example

Figure 2:
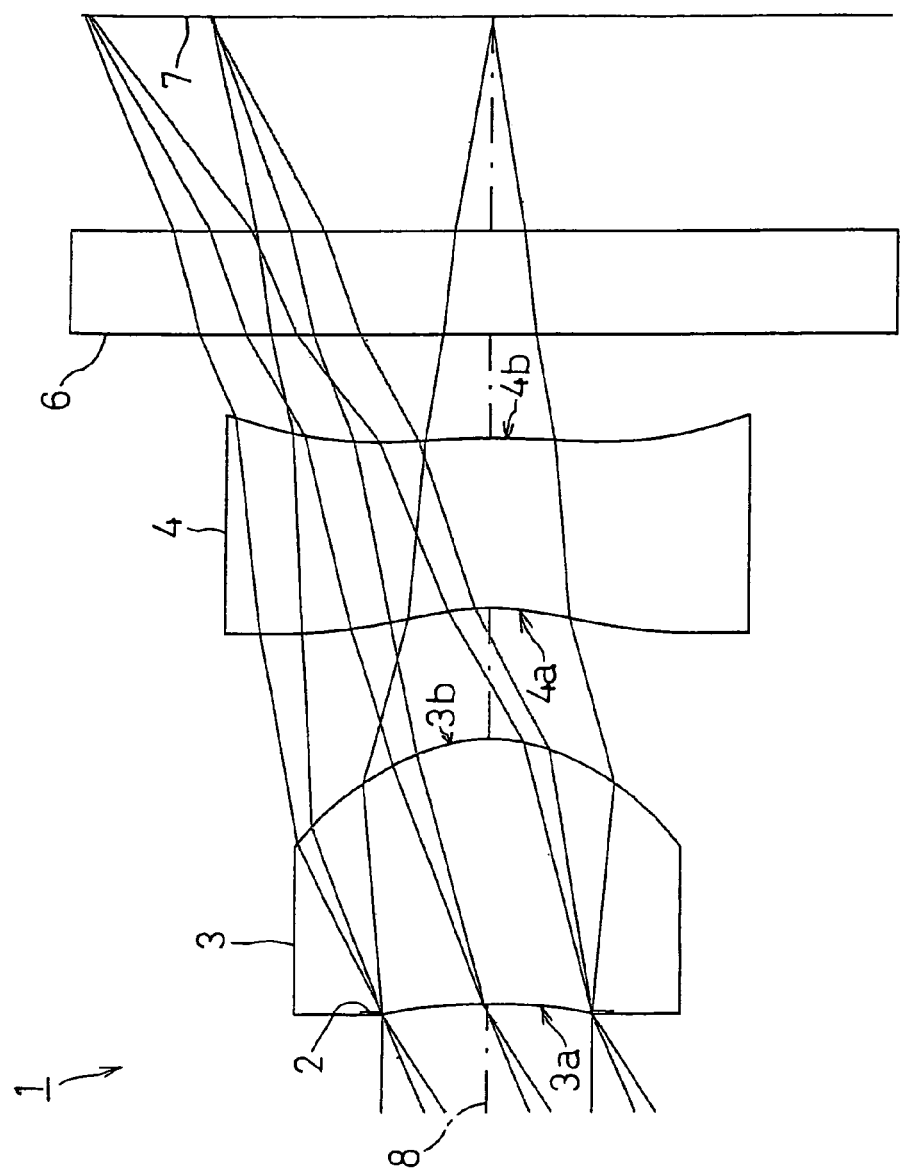
FIG. 2 is a schematic diagram for showing FIRST EXAMPLE of the imaging lens system according to the present invention.

FIG. 2 shows FIRST EXAMPLE of the present invention. In FIRST EXAMPLE, like the imaging lens system 1 with the structure of FIG. 1, a diaphragm 2 was disposed on the object side of the first face 3a of the first lens 3, and a cover glass as a filter 6 is disposed between the second face 4b of the second lens 4 and an image taking surface 7.

The imaging lens system 1 of FIRST EXAMPLE was set under the following condition.

Lens Data

L=2.766 mm, fl=1.803 mm, $f_1$=0.99 mm, $f_2$=-2.02 mm, $d_1$=0.762 mm, $d_2$=0.377 mm, $d_3$=0.482 mm, $r_1$=-2.272 mm, $r_2$=-0.480 mm, $r_3$=-0.700 mm, $r_4$=-2.145 mm, D=1.651, S=0.02, Bfl=1.115, F no=2.85

| Face Number | r | d | nd | vd |
|---|---|---|---|---|
| (Object Point) | ∞ | 0.020 | | |
| 1 (Diaphragm) | | | | |
| 2 (First Face of First Lens) | -2.272 | 0.762 | 1.531 | 56.0 |
| 3 (Second Face of First Lens) | -0.480 | 0.377 | | |
| 4 (First Face of Second Lens) | -0.700 | 0.492 | 1.585 | 30.0 |
| 5 (Second Face of Second Lens) | -2.145 | 0.300 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | -0.985E | 0.114E+1 | -0.237E+2 | 0.222E+2 |
| 3 | -2.440 | -0.879E | 0.853E | -0.261E+1 | -0.522E |
| 4 | -8.166 | 0.119E+1 | -0.235E+1 | -0.347E | 0.103E+2 |
| 5 | -54.219 | 0.956E | -0.902E | -0.239E+1 | 0.766E+1 |

Under such condition, L/fl=1.534 was achieved, thereby satisfying the expression (1), and $f/f_2$=-0.490 was achieved, thereby satisfying the expression (2). Further, $f_1$/fl=0.549 was achieved, thereby satisfying the expression (3), and $f_2$/fl=-1.120 was achieved, thereby satisfying the expression (4). Furthermore, $d_2/d_1$=0.495 was achieved, thereby satisfying the expression (5), and fl=1.803 was achieved, thereby satisfying the expression (6). Moreover, $(r_3+r_4)/(r_3-r_4)$=-1.969 was achieved, thereby satisfying the expression (7), and $d_1$/fl=0.423 was achieved, thereby satisfying the expression (8). Also, $d_3$/fl=0.267 was achieved, thereby satisfying the expression (9), and $v_2$=30.0 was achieved, thereby satisfying the expression (10). Further, D/fl=0.916 was achieved, thereby satisfying the expression (11), and S/fl=0.020 was achieved, thereby satisfying the expression (12). Also, $(r_1+r_2)/(r_1-r_2)$=1.536 was achieved, thereby satisfying the expression (13). Furthermore, Bfl/fl=0.618 was achieved, thereby satisfying the expression (14), and Bfl=1.115 was achieved, thereby satisfying the expression (15).

Figure 3:
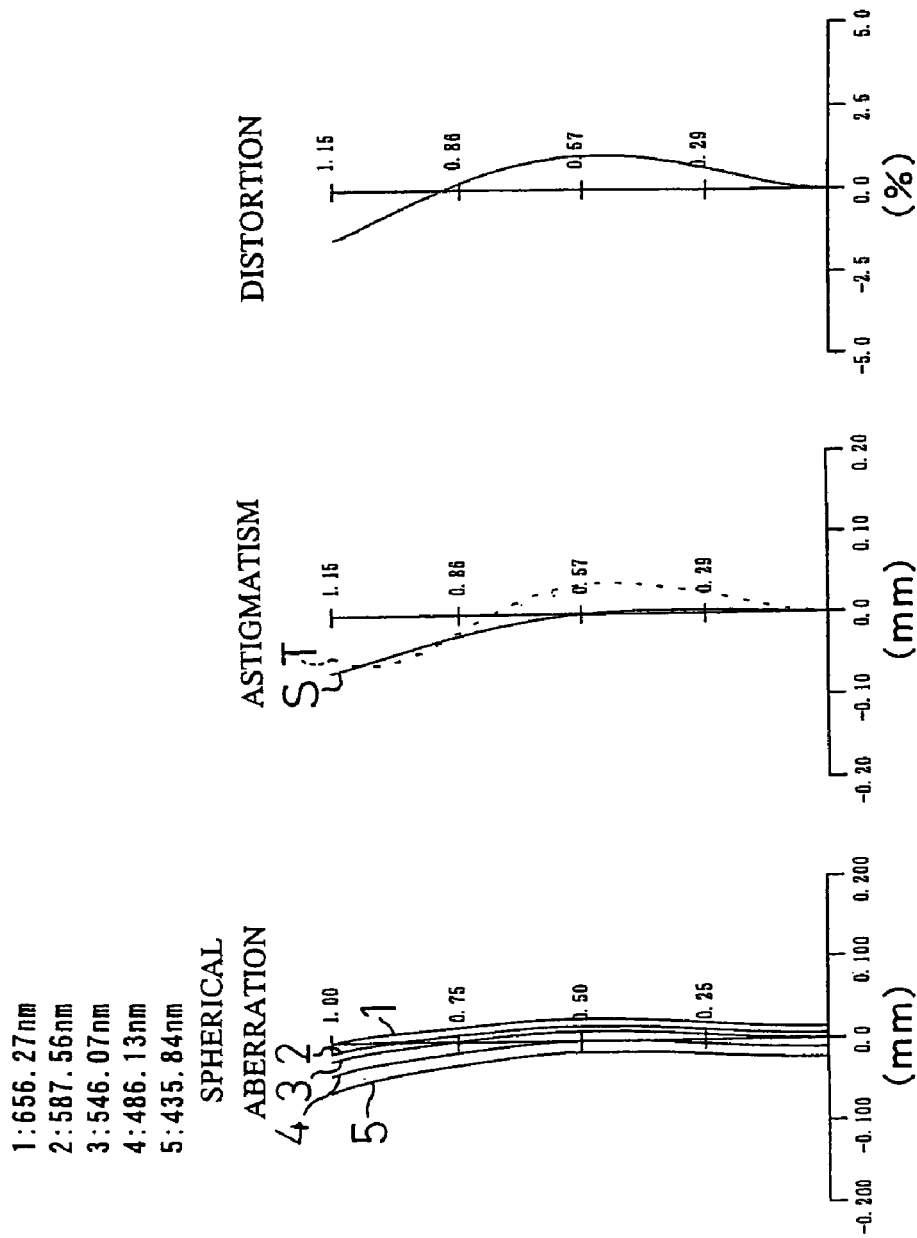
FIG. 3 show graphs for describing the spherical aberration, astigmatism, and distortion of the imaging lens system shown in FIG. 2.

FIG. 3 shows the spherical aberration, astigmatism, and distortion of the imaging lens system 1 of FIRST EXAMPLE.

According to the result, each of the spherical aberration, astigmatism, and distortion was almost satisfied. It can be seen from the result that a sufficient optical property can be obtained.

Second Example

Figure 4:
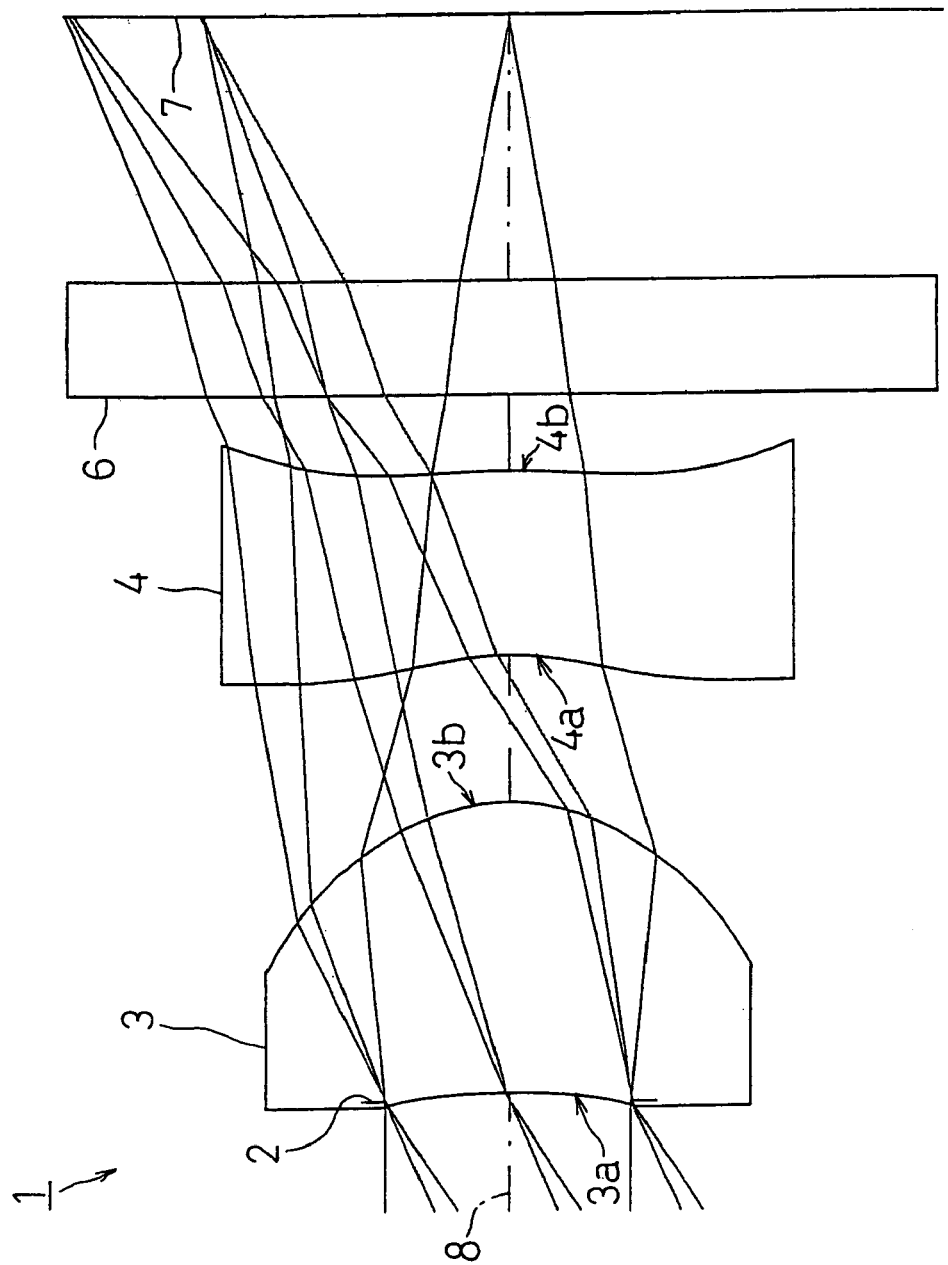
FIG. 4 is a schematic diagram for showing SECOND EXAMPLE of the imaging lens system according to the present invention.

FIG. 4 shows SECOND EXAMPLE of the present invention. In SECOND EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of SECOND EXAMPLE was set under the following condition.

Lens Data

L=2.746 mm, fl=1.798 mm, $f_1$=1 mm, $f_2$=−2.01 mm, $d_1$=0.761 mm, $d_2$=0.384 mm, $d_3$=0.486 mm, $r_1$=−2.355 mm, $r_2$=−0.483 mm, $r_3$=−0.700 mm, $r_4$=−2.145 mm, D=1.651, S=0.02, Bfl=1.095, F no=2.85

| Face Number | r | d | nd | vd |
|---|---|---|---|---|
| (Object Point) | ∞ | 0.020 | | |
| 1 (Diaphragm) | | | | |
| 2 (First Face of First Lens) | −2.355 | 0.761 | 1.531 | 56.0 |
| 3 (Second Face of First Lens) | −0.483 | 0.384 | | |
| 4 (First Face of Second Lens) | −0.700 | 0.486 | 1.585 | 30.0 |
| 5 (Second Face of Second Lens) | −2.145 | 0.200 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.105E+1 | 0.194E+1 | −0.254E+2 | 0.129E+2 |
| 3 | −2.467 | −0.889E | 0.870E | −0.237E+1 | −0.112E+1 |
| 4 | −8.045 | 0.122E+1 | −0.235E+1 | −0.355E | 0.102E+2 |
| 5 | −43.405 | 0.101E+1 | −0.915E | −0.240E+1 | 0.768E+1 |

Under such condition, L/fl=1.527 was achieved, thereby satisfying the expression (1), and $f_1/f_2$=−0.498 was achieved, thereby satisfying the expression (2). Further, $f_1$/fl=0.556 was achieved, thereby satisfying the expression (3), and $f_2$/fl=−1.118 was achieved, thereby satisfying the expression (4). Furthermore, $d_2/d_1$=0.505 was achieved, thereby satisfying the expression (5), and fl=1.798 was achieved, thereby satisfying the expression (6). Moreover, $(r_3+r_4)/(r_3-r_4)$=−1.969 was achieved, thereby satisfying the expression (7), and $d_1$/fl=0.423 was achieved, thereby satisfying the expression (8). Also, $d_3$/fl=0.270 was achieved, thereby satisfying the expression (9), and $v_2$=30.0 was achieved, thereby satisfying the expression (10). Further, D/fl=0.918 was achieved, thereby satisfying the expression (11), and S/fl=0.020 was achieved, thereby satisfying the expression (12). Also, $(r_1+r_2)/(r_1-r_2)$=1.516 was achieved, thereby satisfying the expression (13). Furthermore, Bfl/fl=0.609 was achieved, thereby satisfying the expression (14), and Bfl=1.095 was achieved, thereby satisfying the expression (15).

Figure 5:
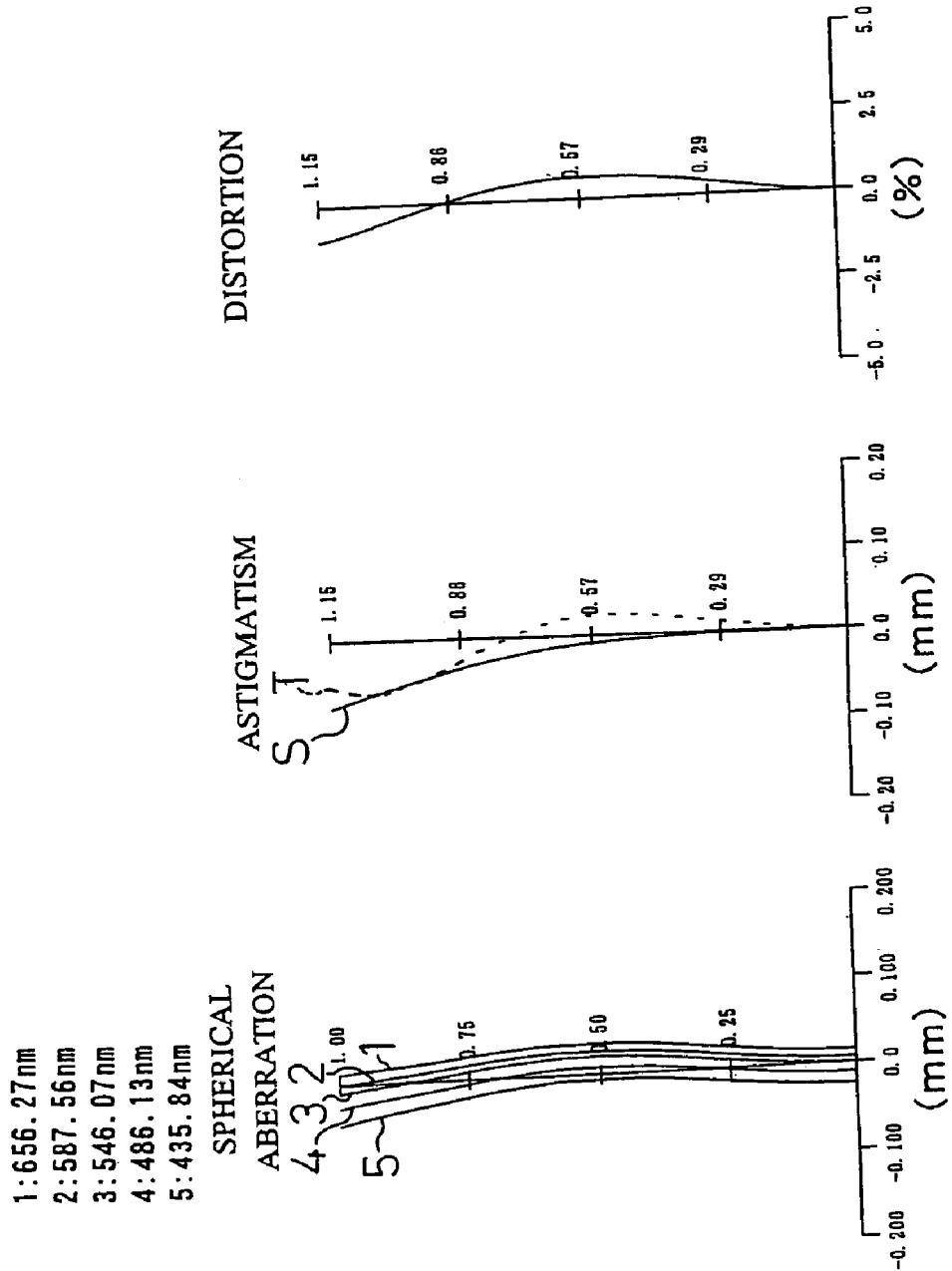
FIG. 5 show graphs for describing the spherical aberration, astigmatism, and distortion of the imaging lens system shown in FIG. 4.

FIG. 5 shows the spherical aberration, astigmatism, and distortion of the imaging lens system 1 of SECOND EXAMPLE.

According to the result, each of the spherical aberration, astigmatism, and distortion was almost satisfied. It can be seen from the result that a sufficient optical property can be obtained.

Third Example

Figure 6:
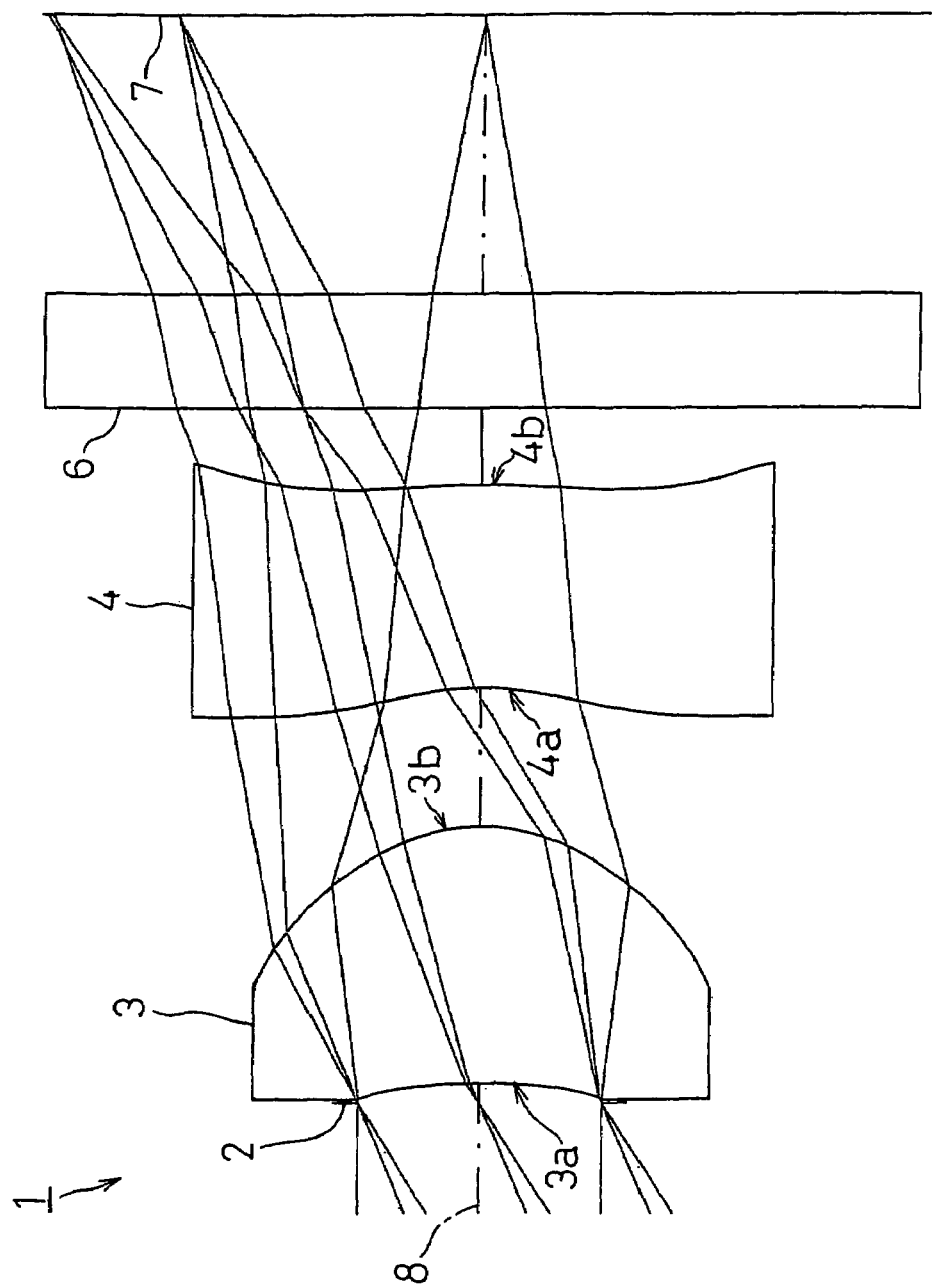
FIG. 6 is a schematic diagram for showing THIRD EXAMPLE of the imaging lens system according to the present invention.

FIG. 6 shows THIRD EXAMPLE of the present invention. In THIRD EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of THIRD EXAMPLE was set under the following condition.

Lens Data

L=2.739 mm, fl=1.805 mm, $f_1$=0.98 mm, $f_2$=−2.04 mm, $d_1$=0.671 mm, $d_2$=0.361 mm, $d_3$=0.534 mm, $r_1$=−1.984 mm, $r_2$=−0.464 mm, $r_3$=−0.700 mm, $r_4$=−2.145 mm, D=1.616, S=0.05, Bfl=1.123, F no=2.85

| Face Number | r | d | nd | vd |
|---|---|---|---|---|
| (Object Point) | ∞ | 0.050 | | |
| 1 (Diaphragm) | | | | |
| 2 (First Face of First Lens) | −1.984 | 0.671 | 1.531 | 56.0 |
| 3 (Second Face of First Lens) | −0.464 | 0.361 | | |
| 4 (First Face of Second Lens) | −0.700 | 0.534 | 1.585 | 30.0 |
| 5 (Second Face of Second Lens) | −2.145 | 0.200 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.119E+1 | −0.323E | −0.130E+1 | −0.141E+3 |
| 3 | −2.447 | −0.107E+1 | 0.369E | 0.100E+1 | −0.109E+2 |
| 4 | −7.662 | 0.114E+1 | −0.228E+1 | 0.549E | 0.842E+1 |
| 5 | −13.639 | 0.107E+1 | −0.109E+1 | −0.232E+1 | 0.859E+1 |

Under such condition, L/fl=1.517 was achieved, thereby satisfying the expression (1), and $f_1/f_2$=−0.480 was achieved, thereby satisfying the expression (2). Further, $f_1$/fl=0.543 was achieved, thereby satisfying the expression (3), and $f_2$/fl=−1.130 was achieved, thereby satisfying the expression (4). Furthermore, $d_2/d_1$=0.538 was achieved, thereby satisfying the expression (5), and fl=1.805 was achieved, thereby satisfying the expression (6). Moreover, $(r_3+r_4)/(r_3-r_4)$=−1.969 was achieved, thereby satisfying the expression (7), and $d_1$/fl=0.372 was achieved, thereby satisfying the expression (8). Also, $d_3$/fl=0.296 was achieved, thereby satisfying the expression (9), and $v_2$=30.0 was achieved, thereby satisfying the expression (10). Further, D/fl=0.895 was achieved, thereby satisfying the expression (11), and S/fl=0.051 was achieved, thereby satisfying the expression (12). Also, $(r_1+r_2)/(r_1-r_2)$=1.611 was achieved, thereby satisfying the expression (13). Furthermore, Bfl/fl=0.622 was achieved, thereby satisfying the expression (14), and Bfl=1.123 was achieved, thereby satisfying the expression (15).

Figure 7:
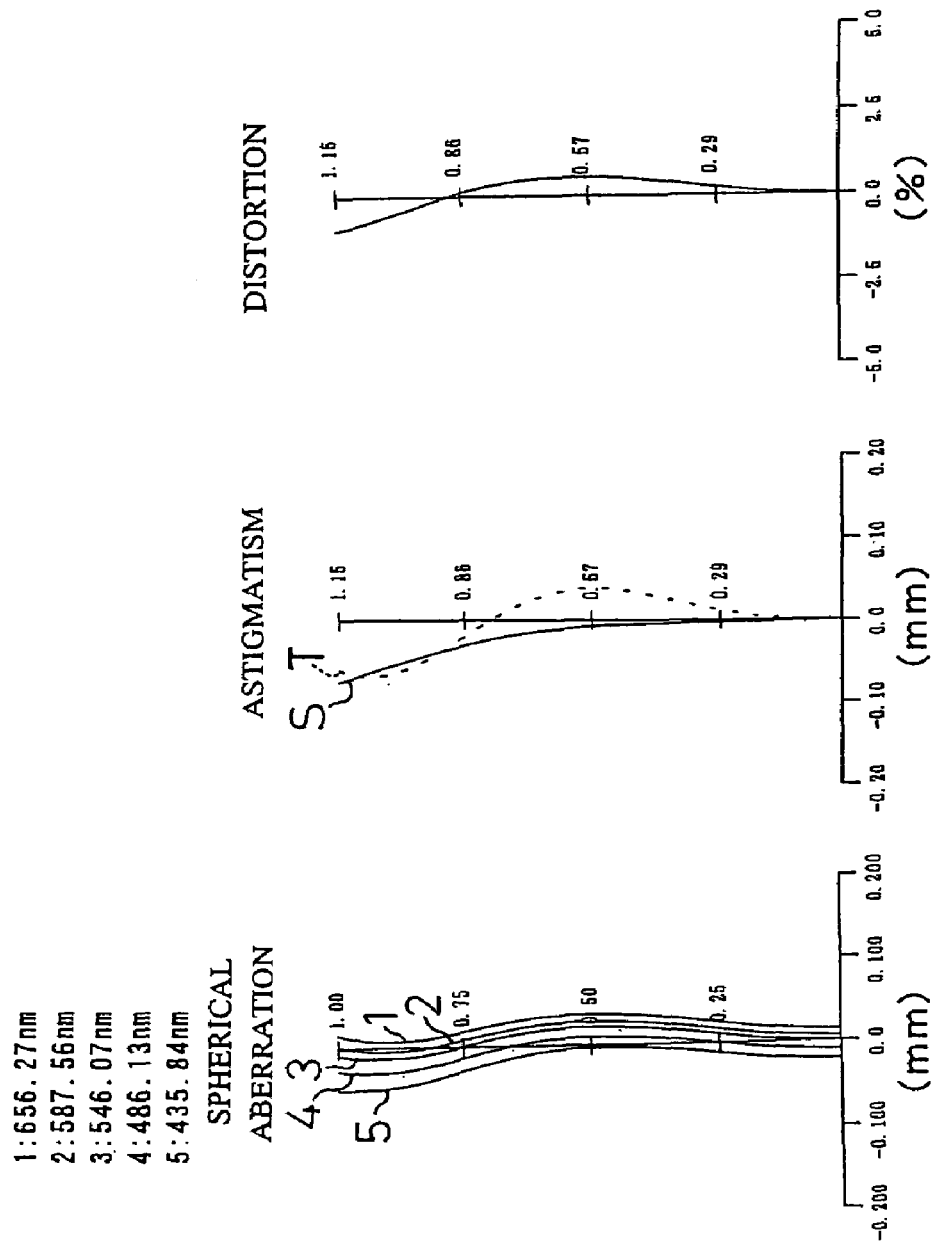
FIG. 7 show graphs for describing the spherical aberration, astigmatism, and distortion of the imaging lens system shown in FIG. 6.

FIG. 7 shows the spherical aberration, astigmatism, and distortion of the imaging lens system 1 of THIRD EXAMPLE.

According to the result, each of the spherical aberration, astigmatism, and distortion was almost satisfied. It can be seen from the result that a sufficient optical property can be obtained.

Fourth Example

Figure 8:
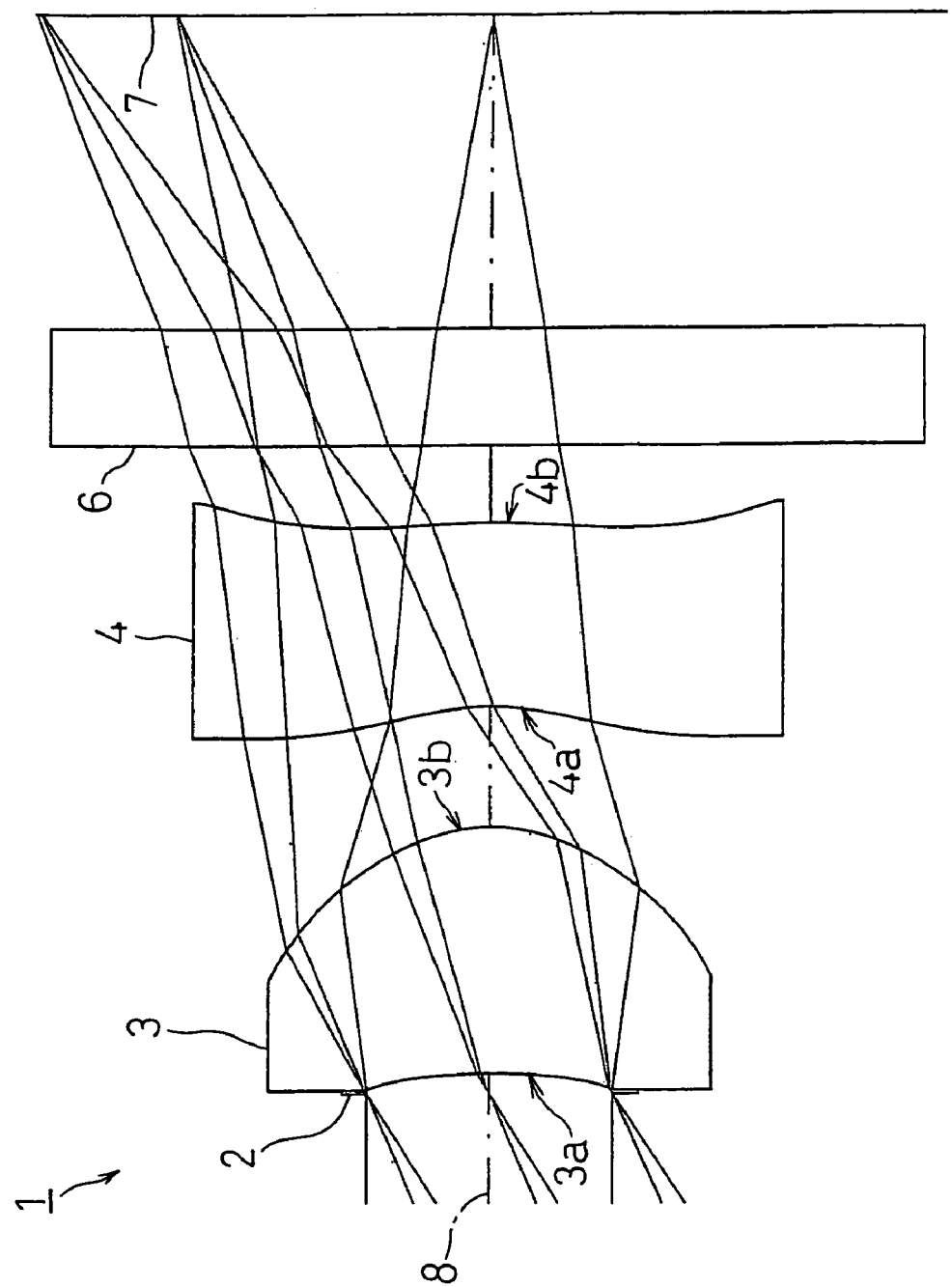
FIG. 8 is a schematic diagram for showing FOURTH EXAMPLE of the imaging lens system according to the present invention.

FIG. 8 shows FOURTH EXAMPLE of the present invention. In FOURTH EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of FOURTH EXAMPLE was set under the following condition.

Lens Data

L=2.664 mm, fl=1.802 mm, $f_1$=0.93 mm, $f_2$=−1.83 mm, $d_1$=0.633 mm, $d_2$=0.308 mm, $d_3$=0.473 mm, $r_1$=−2.144 mm, $r_2$=−0.445 mm, $r_3$=−0.637 mm, $r_4$=−1.990 mm, D=1.464, S=0.05, Bfl=1.200, F no=2.85

| Face Number | r | d | nd | vd |
|---|---|---|---|---|
| (Object Point) | ∞ | 0.050 | | |
| 1 (Diaphragm) | ∞ | 0.050 | | |
| 2 (First Face of First Lens) | −2.144 | 0.633 | 1.531 | 56.0 |
| 3 (Second Face of First Lens) | −0.445 | 0.308 | | |
| 4 (First Face of Second Lens) | −0.637 | 0.473 | 1.585 | 30.0 |
| 5 (Second Face of Second Lens) | −1.990 | 0.200 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.134E+1 | −0.125E | −0.208E+1 | −0.179E+3 |
| 3 | −2.401 | −0.108E+1 | 0.307E | 0.815E−1 | −0.116E+2 |
| 4 | −7.314 | 0.123E+1 | −0.248E+1 | 0.556E | 0.942E+1 |
| 5 | −35.790 | 0.981E | −0.109E+1 | −0.208E+1 | 0.874E+1 |

Under such condition, L/fl=1.478 was achieved, thereby satisfying the expression (1), and $f_1/f_2$=−0.508 was achieved, thereby satisfying the expression (2). Further, $f_1$/fl=0.516 was achieved, thereby satisfying the expression (3), and $f_2$/fl=−1.016 was achieved, thereby satisfying the expression (4). Furthermore, $d_2/d_1$=0.487 was achieved, thereby satisfying the expression (5), and fl=1.802 was achieved, thereby satisfying the expression (6). Moreover, $(r_3+r_4)/(r_3-r_4)$=−1.942 was achieved, thereby satisfying the expression (7), and $d_1$/fl=0.351 was achieved, thereby satisfying the expression (8). Also, $d_3$/fl=0.262 was achieved, thereby satisfying the expression (9), and $v_2$=30.0 was achieved, thereby satisfying the expression (10). Further, D/fl=0.812 was achieved, thereby satisfying the expression (11), and S/fl=0.054 was achieved, thereby satisfying the expression (12). Also, $(r_1+r_2)/(r_1-r_2)$=1.524 was achieved, thereby satisfying the expression (13). Furthermore, Bfl/fl=0.666 was achieved, thereby satisfying the expression (14), and Bfl=1.200 was achieved, thereby satisfying the expression (15).

Figure 9:
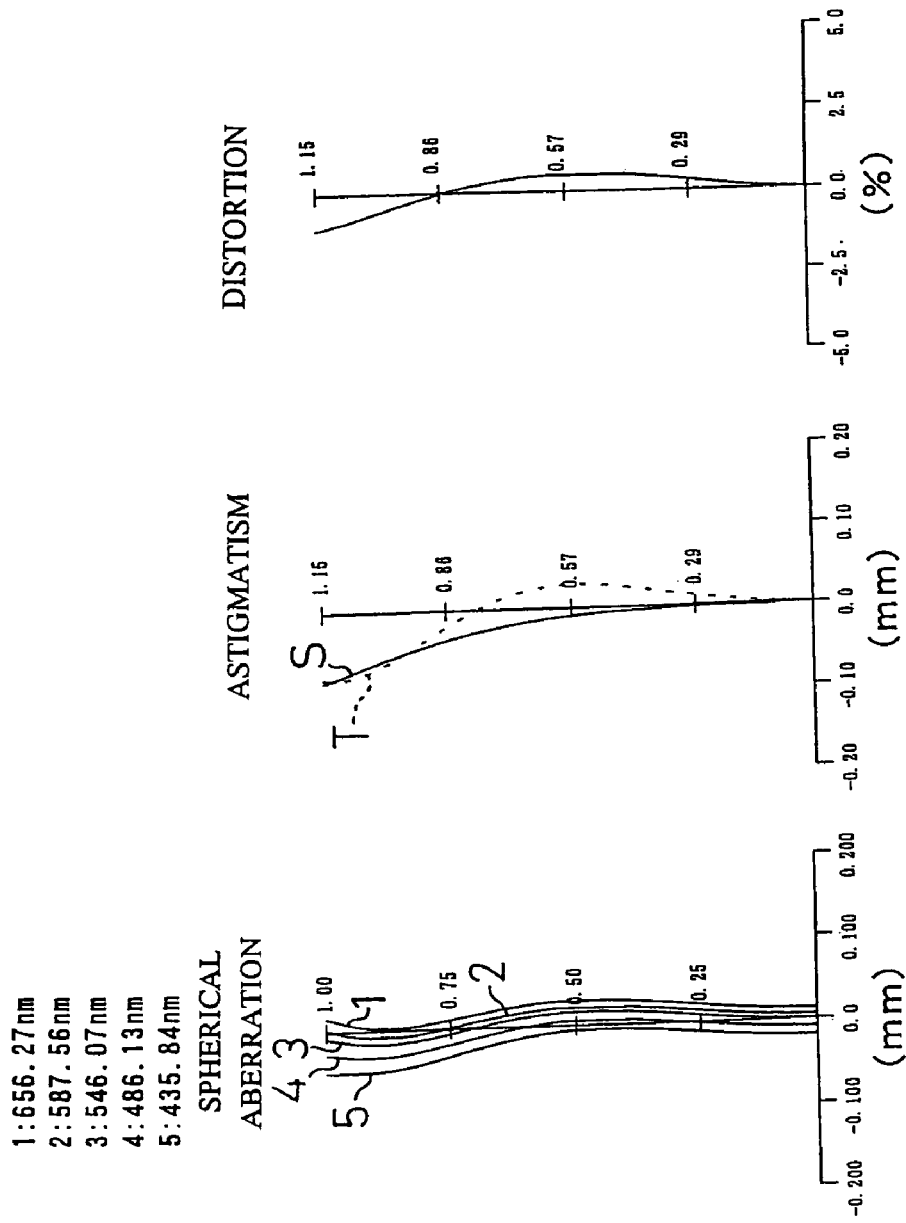
FIG. 9 show graphs for describing the spherical aberration, astigmatism, and distortion of the imaging lens system shown in FIG. 8.

FIG. 9 shows the spherical aberration, astigmatism, and distortion of the imaging lens system 1 of FOURTH EXAMPLE.

According to the result, each of the spherical aberration, astigmatism, and distortion was almost satisfied. It can be seen from the result that a sufficient optical property can be obtained.

Fifth Example

Figure 10:
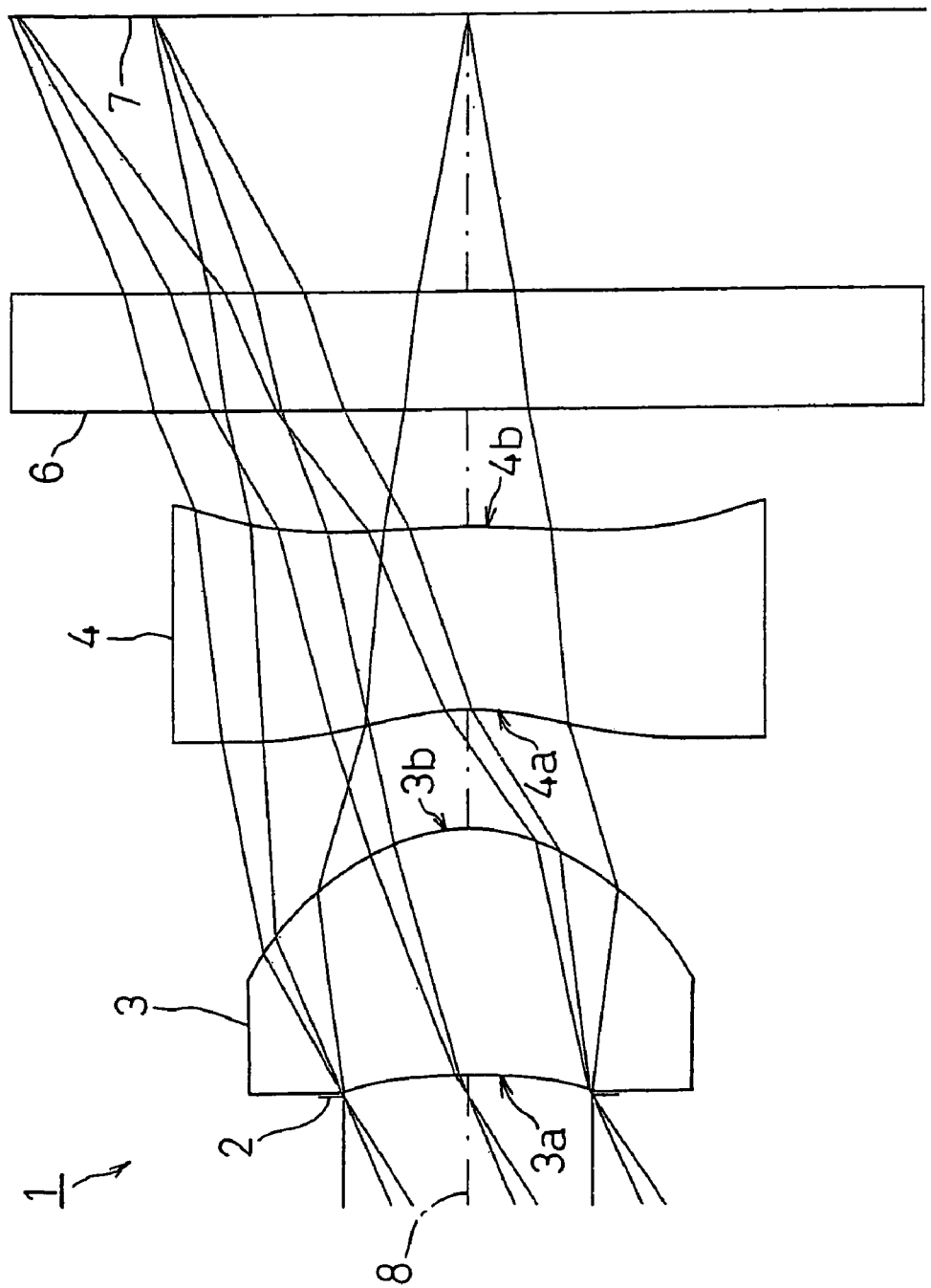
FIG. 10 is a schematic diagram for showing FIFTH EXAMPLE of the imaging lens system according to the present invention.

FIG. 10 shows FIFTH EXAMPLE of the present invention. In FIFTH EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of FIFTH EXAMPLE was set under the following condition.

Lens Data

L=2.646 mm, fl=1.802 mm, $f_1$=0.93 mm, $f_2$=−1.79 mm, $d_1$=0.628 mm, $d_2$=0.302 mm, $d_3$=0.466 mm, $r_1$=−2.190 mm, $r_2$=−0.445 mm, $r_3$=−0.651 mm, $r_4$=−2.148 mm, D=1.446, S=0.05, Bfl=1.200, F no=2.85

| Face Number | r | d | nd | vd |
|---|---|---|---|---|
| (Object Point) | ∞ | 0.050 | | |
| 1 (Diaphragm) | ∞ | 0.050 | | |
| 2 (First Face of First Lens) | −2.190 | 0.628 | 1.531 | 56.0 |
| 3 (Second Face of First Lens) | −0.445 | 0.302 | | |
| 4 (First Face of Second Lens) | −0.651 | 0.466 | 1.585 | 30.0 |
| 5 (Second Face of Second Lens) | −2.148 | 0.300 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.136E+1 | −0.187E−1 | −0.183E+1 | −0.188E+3 |
| 3 | −2.414 | −0.109E+1 | 0.260E | −0.279E−1 | −0.112E+2 |
| 4 | −7.508 | 0.122E+1 | −0.251E+1 | 0.606E | 0.966E+1 |
| 5 | −44.553 | 0.975E | −0.110E+1 | −0.206E+1 | 0.879E+1 |

Under such condition, L/fl=1.468 was achieved, thereby satisfying the expression (1), and $f_1/f_2$=−0.520 was achieved, thereby satisfying the expression (2). Further, $f_1$/fl=0.516 was achieved, thereby satisfying the expression (3), and $f_2$/fl=−0.993 was achieved, thereby satisfying the expression (4). Furthermore, $d_2/d_1$=0.481 was achieved, thereby satisfying the expression (5), and fl=1.802 was achieved, thereby satisfying the expression (6). Moreover, $(r_3+r_4)/(r_3-r_4)$=−1.870 was achieved, thereby satisfying the expression (7), and $d_1$/fl=0.349 was achieved, thereby satisfying the expression (8). Also, $d_3$/f=0.259 was achieved, thereby satisfying the expression (9), and $v_2$=30.0 was achieved, thereby satisfying the expression (10). Further, D/fl=0.802 was achieved, thereby satisfying the expression (11), and S/fl=0.054 was achieved, thereby satisfying the expression (12). Also, $(r_1+r_2)/(r_1-r_2)$=1.510 was achieved, thereby satisfying the expression (13). Furthermore, Bfl/fl=0.666 was achieved, thereby satisfying the expression (14), and Bfl=1.200 was achieved, thereby satisfying the expression (15).

Figure 11:
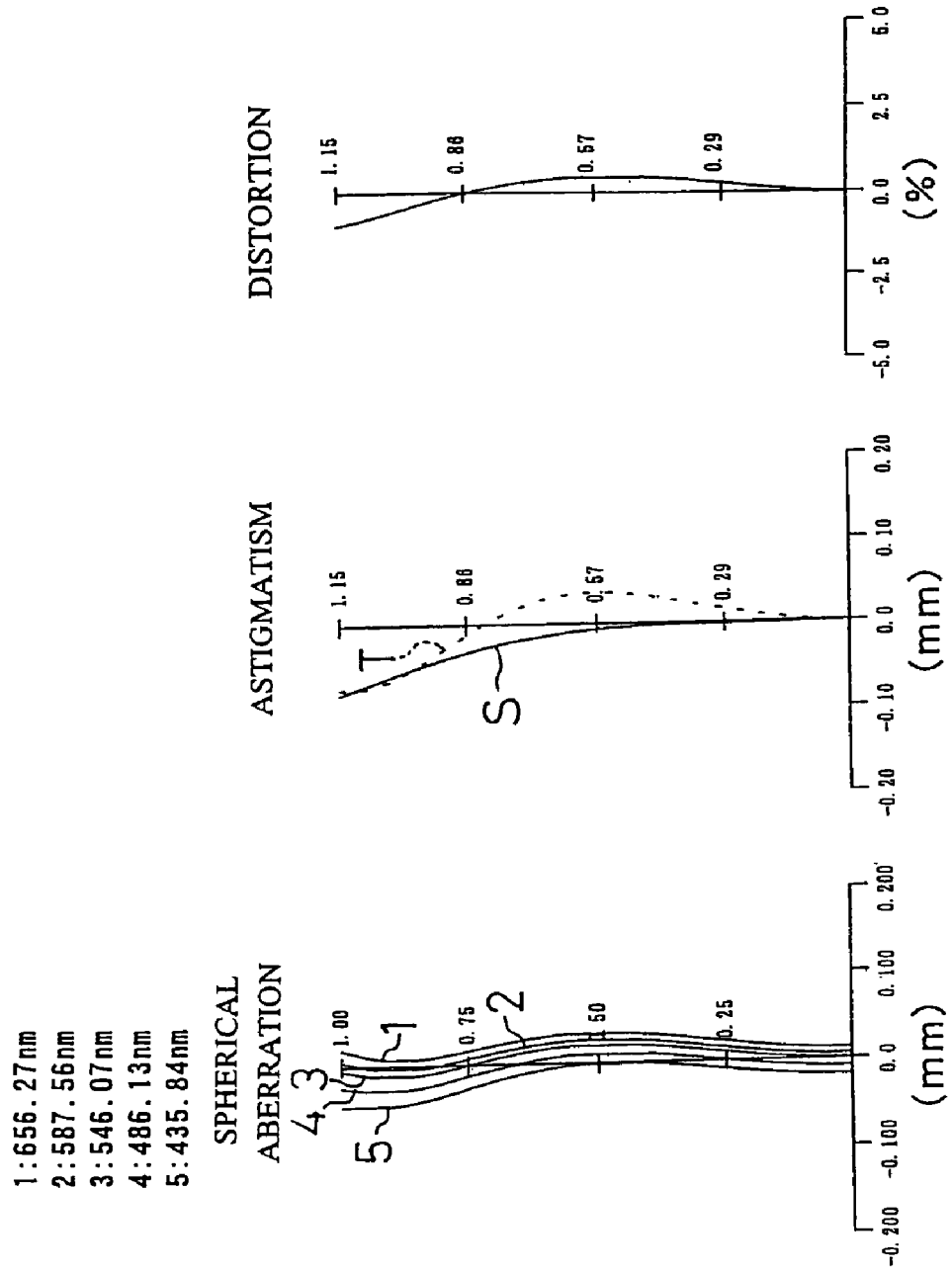
FIG. 11 show graphs for describing the spherical aberration, astigmatism, and distortion of the imaging lens system shown in FIG. 10.

FIG. 11 shows the spherical aberration, astigmatism, and distortion of the imaging lens system 1 of FIFTH EXAMPLE.

According to the result, each of the spherical aberration, astigmatism, and distortion was almost satisfied. It can be seen from the result that a sufficient optical property can be obtained.

Sixth Example

Figure 12:
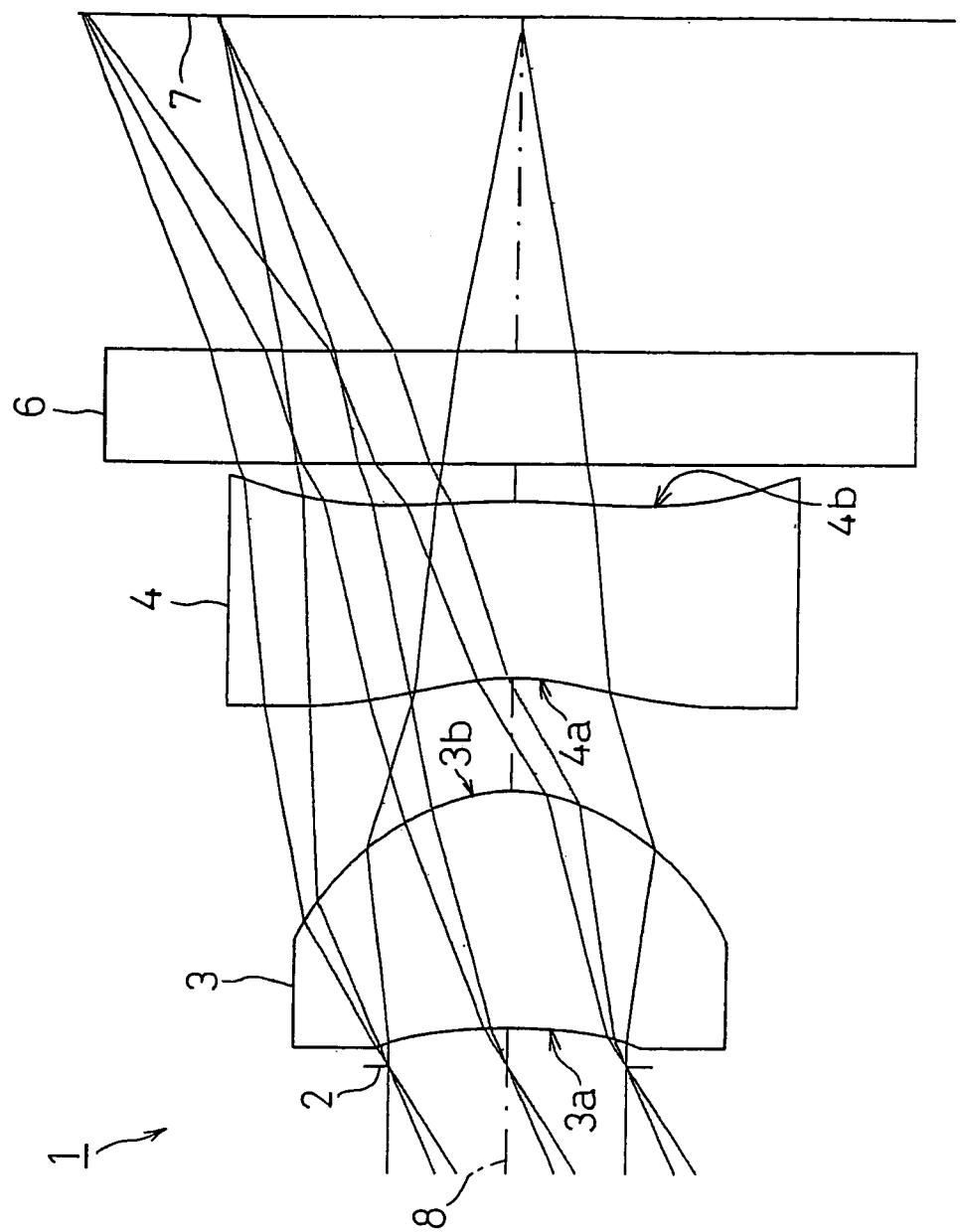
FIG. 12 is a schematic diagram for showing SIXTH EXAMPLE of the imaging lens system according to the present invention.

FIG. 12 shows SIXTH EXAMPLE of the present invention. In SIXTH EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of SIXTH EXAMPLE was set under the following condition.

Lens Data

L=2.685 mm, fl=1.787 mm, $f_1$=0.93 mm, $f_2$=−1.79 mm, $d_1$=0.630 mm, $d_2$=0.300 mm, $d_3$=0.470 mm, $r_1$=−2.222 mm, $r_2$=−0.444 mm, $r_3$=−0.651 mm, $r_4$=−2.151 mm, D=1.5, S=0.1, Bfl=1.185, F no=2.85

| Face Number | r | d | nd | vd |
|---|---|---|---|---|
| (Object Point) | ∞ | 0.100 | | |
| 1 (Diaphragm) | ∞ | 0.100 | | |
| 2 (First Face of First Lens) | −2.222 | 0.630 | 1.531 | 56.0 |
| 3 (Second Face of First Lens) | −0.444 | 0.300 | | |
| 4 (First Face of Second Lens) | −0.651 | 0.470 | 1.585 | 30.0 |
| 5 (Second Face of Second Lens) | −2.151 | 0.100 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.152E+1 | 0.760E+1 | −0.114E+3 | 0.333E+3 |
| 3 | −2.235 | −0.842E | −0.877E | 0.285E+1 | −0.141E+2 |
| 4 | −7.212 | 0.134E+1 | −0.337E+1 | 0.416E+1 | 0.163E+1 |
| 5 | −36.925 | 0.103E+1 | −0.132E+1 | −0.139E+1 | 0.744E+1 |

Under such condition, L/fl=1.503 was achieved, thereby satisfying the expression (1), and $f_1/f_2$=−0.520 was achieved, thereby satisfying the expression (2). Further, $f_1$/fl=0.520 was achieved, thereby satisfying the expression (3), and $f_2$/fl=−1.002 was achieved, thereby satisfying the expression (4). Furthermore, $d_2/d_1$=0.476 was achieved, thereby satisfying the expression (5), and fl=1.787 was achieved, thereby satisfying the expression (6). Moreover, $(r_3+r_4)/(r_3-r_4)$=−1.868 was achieved, thereby satisfying the expression (7), and $d_1$/fl=0.353 was achieved, thereby satisfying the expression (8). Also, $d_3$/fl=0.263 was achieved, thereby satisfying the expression (9), and $v_2$=30.0 was achieved, thereby satisfying the expression (10). Further, D/fl=0.839 was achieved, thereby satisfying the expression (11), and S/fl=0.108 was achieved, thereby satisfying the expression (12). Also, $(r_1+r_2)/(r_1-r_2)$=1.499 was achieved, thereby satisfying the expression (13). Furthermore, Bfl/fl=0.663 was achieved, thereby satisfying the expression (14), and Bfl=1.185 was achieved, thereby satisfying the expression (15).

Figure 13:
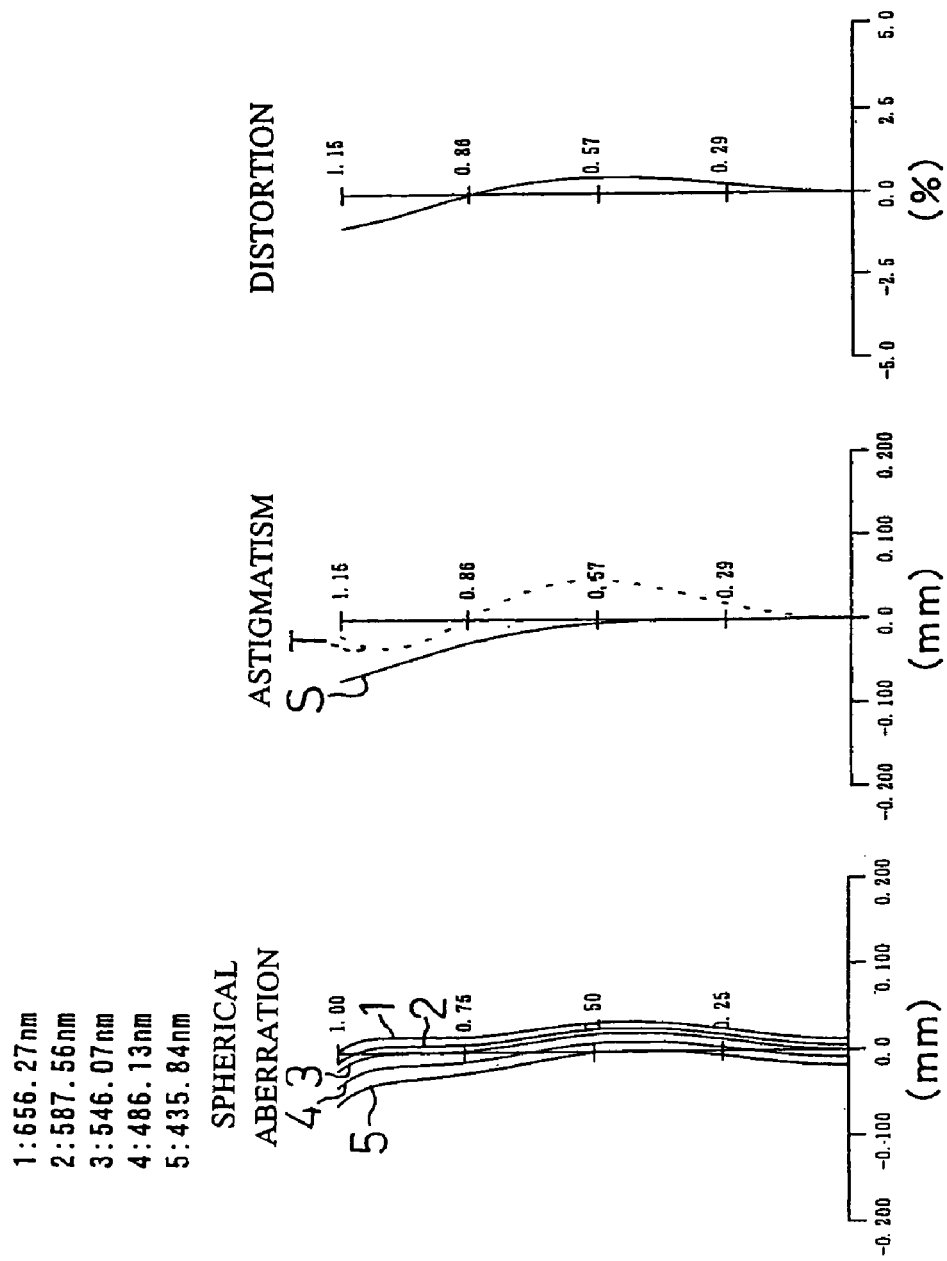
FIG. 13 show graphs for describing the spherical aberration, astigmatism, and distortion of the imaging lens system shown in FIG. 12.

FIG. 13 shows the spherical aberration, astigmatism, and distortion of the imaging lens system 1 of SIXTH EXAMPLE.

According to the result, each of the spherical aberration, astigmatism, and distortion was almost satisfied. It can be seen from the result that a sufficient optical property can be obtained.

Seventh Example

Figure 14:
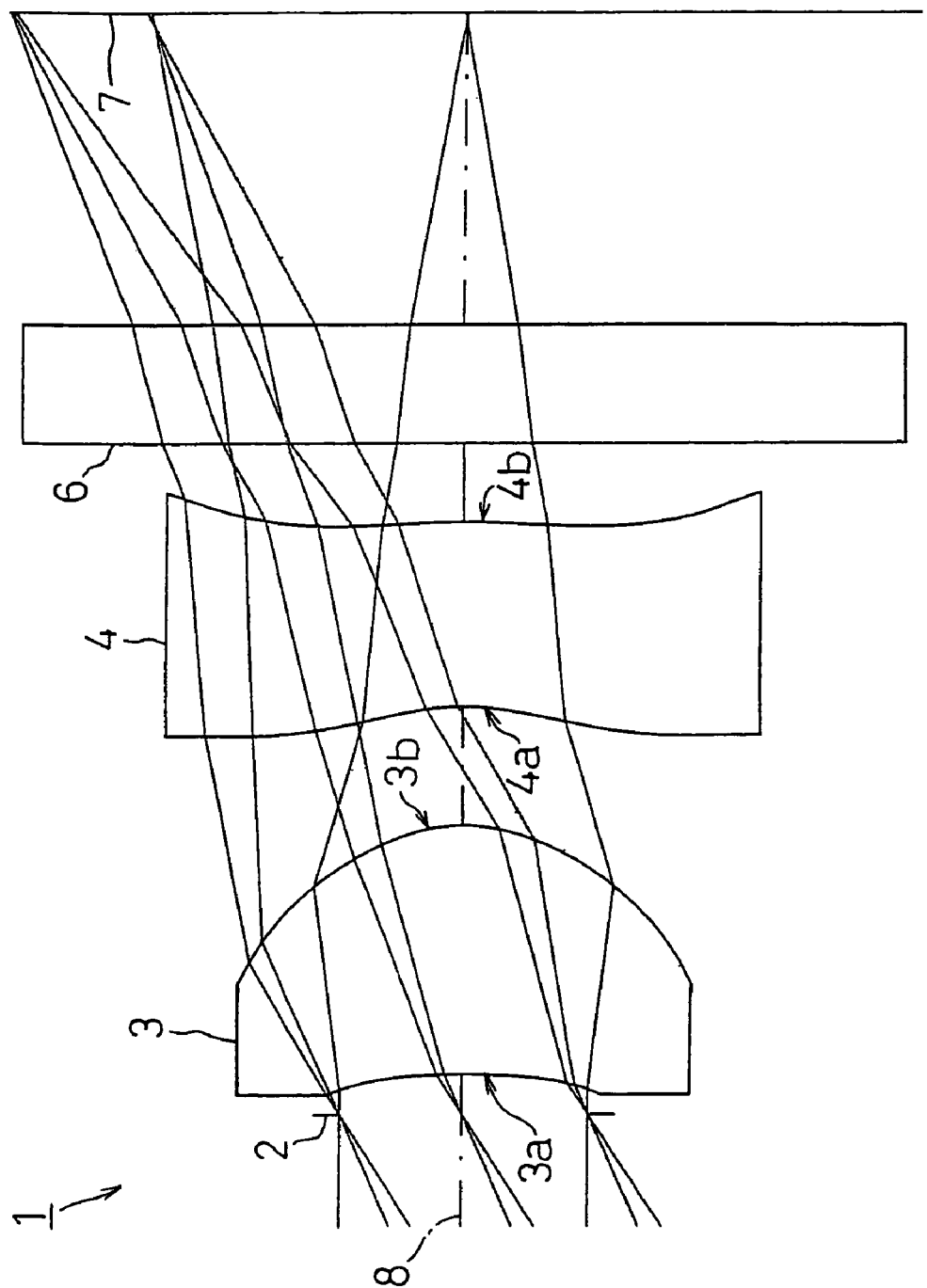
FIG. 14 is a schematic diagram for showing SEVENTH EXAMPLE of the imaging lens system according to the present invention.

FIG. 14 shows SEVENTH EXAMPLE of the present invention. In SEVENTH EXAMPLE, like the imaging lens system 1 with the structure shown in FIG. 1, a diaphragm 2 was disposed on the object side of the first face 3a of the first lens 3, and a cover glass as a filter 6 is disposed between the second face 4b of the second lens 4 and the image taking surface 7.

The imaging lens system 1 of SEVENTH EXAMPLE was set under the following condition.

Lens Data

L=2.685 mm, fl=1.787 mm, $f_1$=0.93 mm, $f_2$=−1.79 mm, $d_1$=0.630 mm, $d_2$=0.300 mm, $d_3$=0.470 mm, $r_1$=−2.222 mm, $r_2$=−0.444 mm, $r_3$=−0.651 mm, $r_4$=−2.151 mm, D=1.5, S=0.1, Bfl=1.185, F no=2.85

| Face Number | r | d | nd | vd |
|---|---|---|---|---|
| (Object Point) | ∞ | 0.100 | | |
| 1 (Diaphragm) | ∞ | 0.100 | | |
| 2 (First Face of First Lens) | −2.222 | 0.630 | 1.531 | 56.0 |
| 3 (Second Face of First Lens) | −0.444 | 0.300 | | |
| 4 (First Face of Second Lens) | −0.651 | 0.470 | 1.585 | 30.0 |
| 5 (Second Face of Second Lens) | −2.151 | 0.200 | | |
| 6 (First Face of Cover Glass) | ∞ | 0.300 | 1.516 | 64.0 |
| 7 (Second Face of Cover Glass) (Image surface) | ∞ | | | |

| Face Number | k | A | B | C | D |
|---|---|---|---|---|---|
| 2 | 0.000 | −0.152E+1 | 0.763E+1 | −0.111E+3 | 0.319E+3 |
| 3 | −2.066 | −0.597E | −0.185E+1 | 0.527E+1 | −0.165E+2 |
| 4 | −6.873 | 0.153E+1 | −0.442E+1 | 0.782E+1 | −0.540E+1 |
| 5 | −22.889 | 0.121E+1 | −0.181E+1 | −0.458E | 0.639E+1 |

Under such condition, L/fl=1.503 was achieved, thereby satisfying the expression (1), and $f_1/f_2$=−0.520 was achieved, thereby satisfying the expression (2). Further, $f_1$/fl=0.520 was achieved, thereby satisfying the expression (3), and $f_2$/fl=−1.002 was achieved, thereby satisfying the expression (4). Furthermore, $d_2/d_1$=0.476 was achieved, thereby satisfying the expression (5), and fl=1.787 was achieved, thereby satisfying the expression (6). Moreover, $(r_3+r_4)/(r_3-r_4)$=−1.868 was achieved, thereby satisfying the expression (7), and $d_1$/fl=0.353 was achieved, thereby satisfying the expression (8). Also, $d_3$/fl=0.263 was achieved, thereby satisfying the expression (9), and $v_2$=30.0 was achieved, thereby satisfying the expression (10). Further, D/fl=0.839 was achieved, thereby satisfying the expression (11), and S/fl=0.108 was achieved, thereby satisfying the expression (12). Also, $(r_1+r_2)/(r_1-r_2)$=1.499 was achieved, thereby satisfying the expression (13). Furthermore, Bfl/fl=0.663 was achieved, thereby satisfying the expression (14), and Bfl=1.185 was achieved, thereby satisfying the expression (15).

Figure 15:
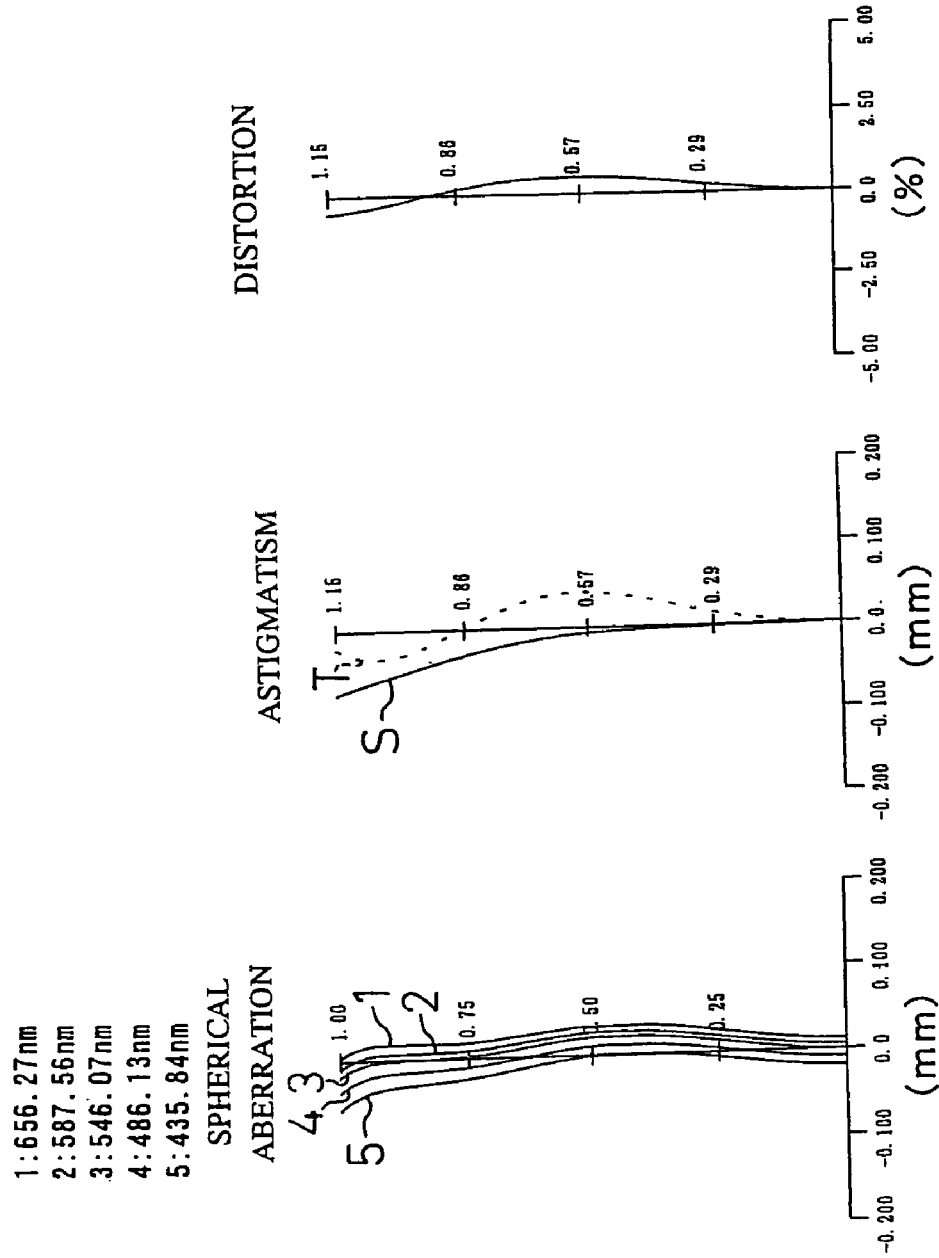
FIG. 15 show graphs for describing the spherical aberration, astigmatism, and distortion of the imaging lens system shown in FIG. 14.

FIG. 15 shows the spherical aberration, astigmatism, and distortion of the imaging lens system 1 of SEVENTH EXAMPLE.

According to the result, each of the spherical aberration, astigmatism, and distortion was almost satisfied. It can be seen from the result that a sufficient optical property can be obtained.

The present invention is not limited to the above-described embodiments and EXAMPLES and various modifications are possible as necessary.

For example, there may be a light-amount regulation plate provided between the second face 3b of the first lens 3 and the first face 4a of the second lens 4 as necessary.

What is claimed is:

1. An imaging lens system used for forming an image of an object on an image taking surface of a solid image sensor element, comprising:

in order from an object side towards an image surface side, a diaphragm, a first lens which is a meniscus lens having a positive power whose concave surface facing said object side, and a second lens which is a meniscus lens having a negative power whose convex surface facing said image surface side, wherein conditions expressed by each of following expressions (1)–(8) are to be satisfied;

$$1.65 \geq L/fl \geq 0.9 \tag{1}$$

$$-0.4 \geq f_1/f_2 \geq -0.7 \tag{2}$$

$$0.63 \geq f_1/fl \geq 0.4 \tag{3}$$

$$-0.85 \geq f_2/fl \geq -1.15 \tag{4}$$

$$0.65 \geq d_2/d_1 \geq 0.35 \tag{5}$$

$$4 \geq fl \geq 1 \tag{6}$$

$$-1.5 > (r_3 + r_4)/(r_3 - r_4) > -2 \tag{7}$$

$$0.45 \geq d_1/fl \geq 0.25 \tag{8}$$

where,

L: entire length of said lens system (distance between said diaphragm and said image taking surface on an optical axis)

fl: focal distance of entire lens system $f_1$: focal distance of said first lens $f_2$: focal distance of said second lens $d_1$: center thickness of said first lens $d_2$: distance between said first lens and said second lens on said optical axis $r_3$: curvature radius of said object side face of said second lens $r_4$: curvature radius of said image surface side face of said second lens.

2. The imaging lens system according to claim 1, wherein, further, a condition expressed by a following expression (9) is to be satisfied;

$$0.3 \geq d_3/fl \geq 0.15 \tag{9}$$

where, $d_3$: center thickness of said second lens.

3. The imaging lens system according to claim 1, wherein Abbe number of said second lens is set smaller than Abbe number of said first lens, and said Abbe number of said second lens satisfies a condition expressed by a following expression;

$$v_2 < 35 \tag{10}$$

where, $v_2$: Abbe number of said second lens.

4. The imaging lens system according to claim 1, wherein, further, a condition expressed by a following expression (11) is to be satisfied;

$$1 \geq D/fl \geq 0.8 \tag{11}$$

where,

D: distance between said diaphragm and said image surface side face of said second lens on said optical axis.

5. The imaging lens system according to claim 1, wherein, further, a condition expressed by a following expression (12) is to be satisfied;

$$0.2 \geq S/f_1 \geq 0.05 \tag{12}$$

where,

S: distance between said diaphragm and said object side face of said first lens on said optical axis.

6. The imaging lens system according to claim 1, wherein, further, a condition expressed by a following expression (13) is to be satisfied;

$$1.7 > (r_1 + r_2)/(r_1 - r_2) > 0.8 \tag{13}$$

where, $r_1$: curvature radius of said object side face of said first lens $r_2$: curvature radius of said image surface side face of said first lens.

7. The imaging lens system according to claim 1, wherein, further, conditions expressed by following expressions (14) and (15) are to be satisfied;

$$0.8 \geq Bfl/fl \geq 0.4 \tag{14}$$

$$1.5 \geq Bfl \geq 0.9 \tag{15}$$

where,

Bfl: back focus distance (distance between said image surface side face of said second lens and said image surface on said optical axis).

* * * * *